Nov. 27, 1934.  O. U. ZERK  1,982,093
CENTRALIZED LUBRICATING SYSTEM
Filed Sept. 21, 1929  17 Sheets-Sheet 1
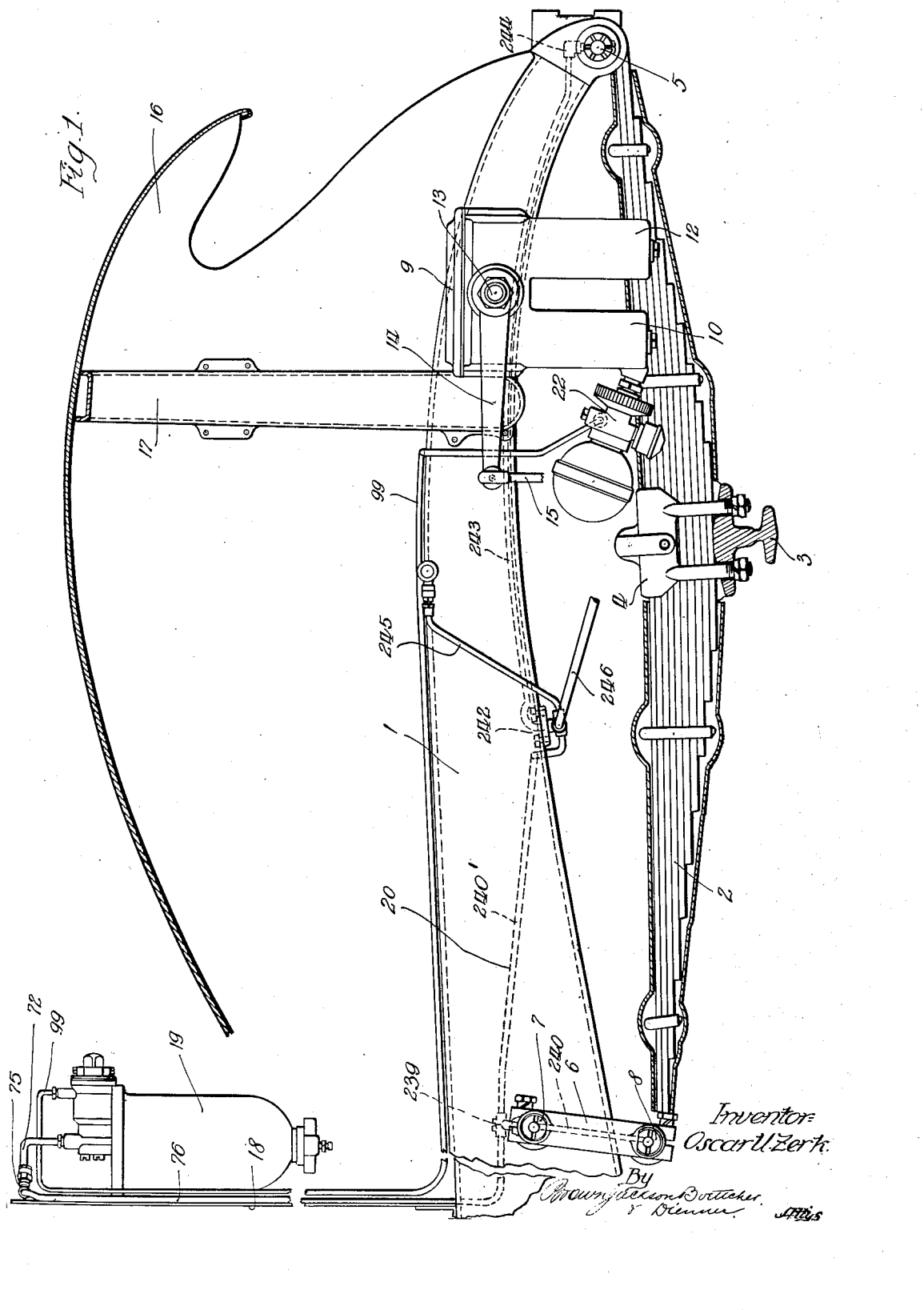

Nov. 27, 1934.       O. U. ZERK              1,982,093
            CENTRALIZED LUBRICATING SYSTEM
              Filed Sept. 21, 1929    17 Sheets-Sheet 2
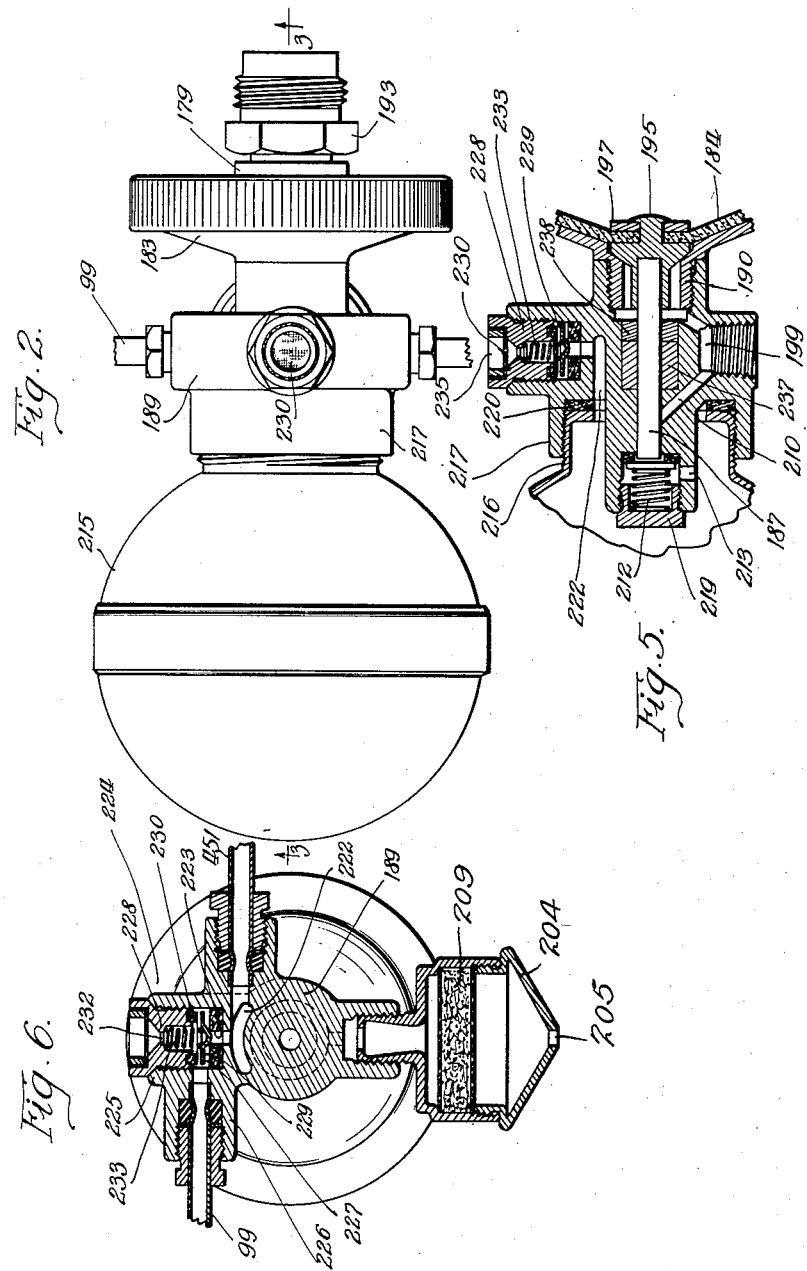
Inventor:
Oscar U. Zerk.

Nov. 27, 1934.  O. U. ZERK  1,982,093
CENTRALIZED LUBRICATING SYSTEM
Filed Sept. 21, 1929   17 Sheets-Sheet 3
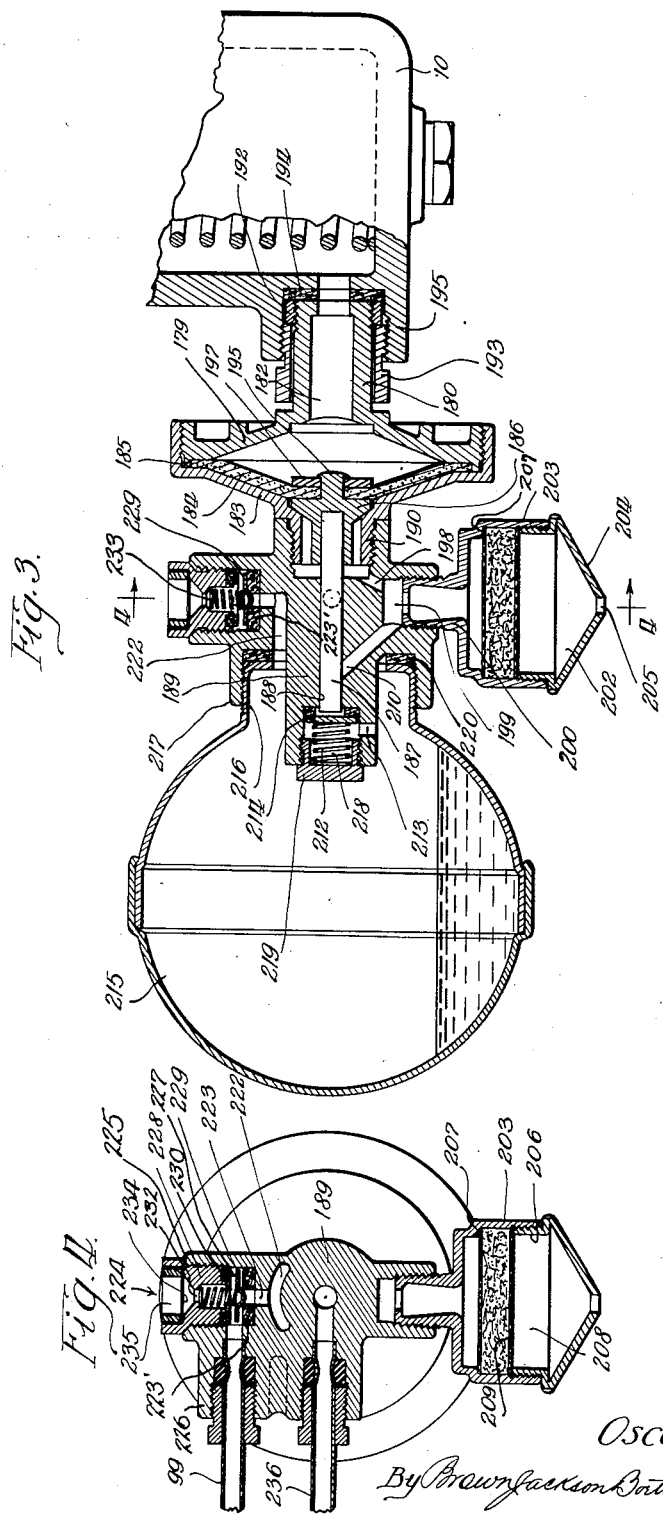

Nov. 27, 1934.     O. U. ZERK     1,982,093
CENTRALIZED LUBRICATING SYSTEM
Filed Sept. 21, 1929     17 Sheets-Sheet 4
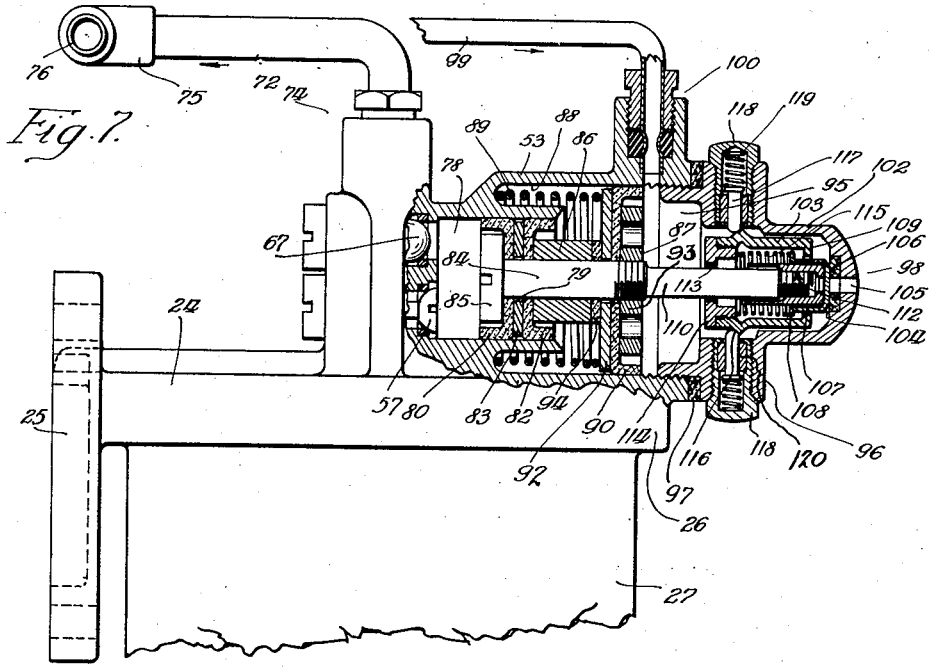
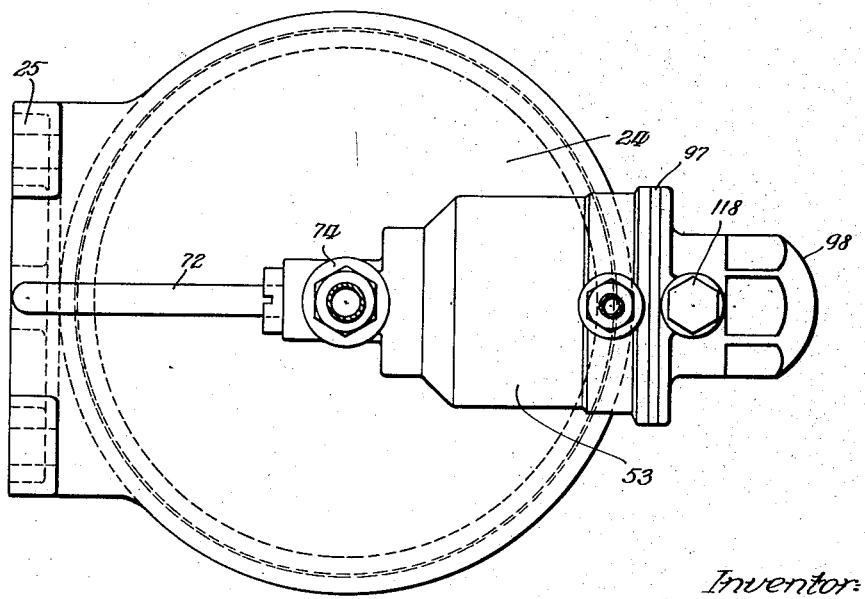
Inventor:
Oscar U. Zerk.
By Brown, Jackson, Boettcher & Dienner
Attys.

Nov. 27, 1934.     O. U. ZERK     1,982,093
CENTRALIZED LUBRICATING SYSTEM
Filed Sept. 21, 1929    17 Sheets-Sheet 5
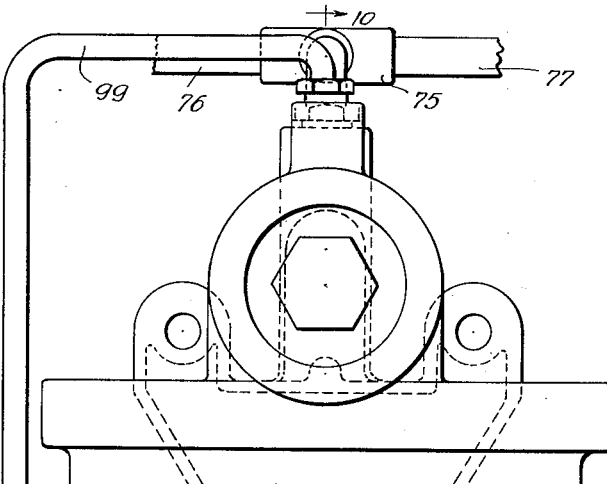
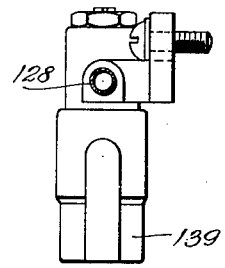
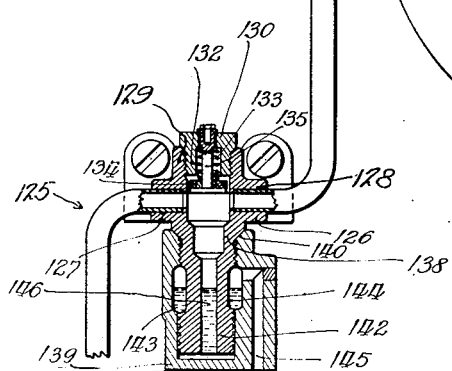
Inventor
Oscar U. Zerk

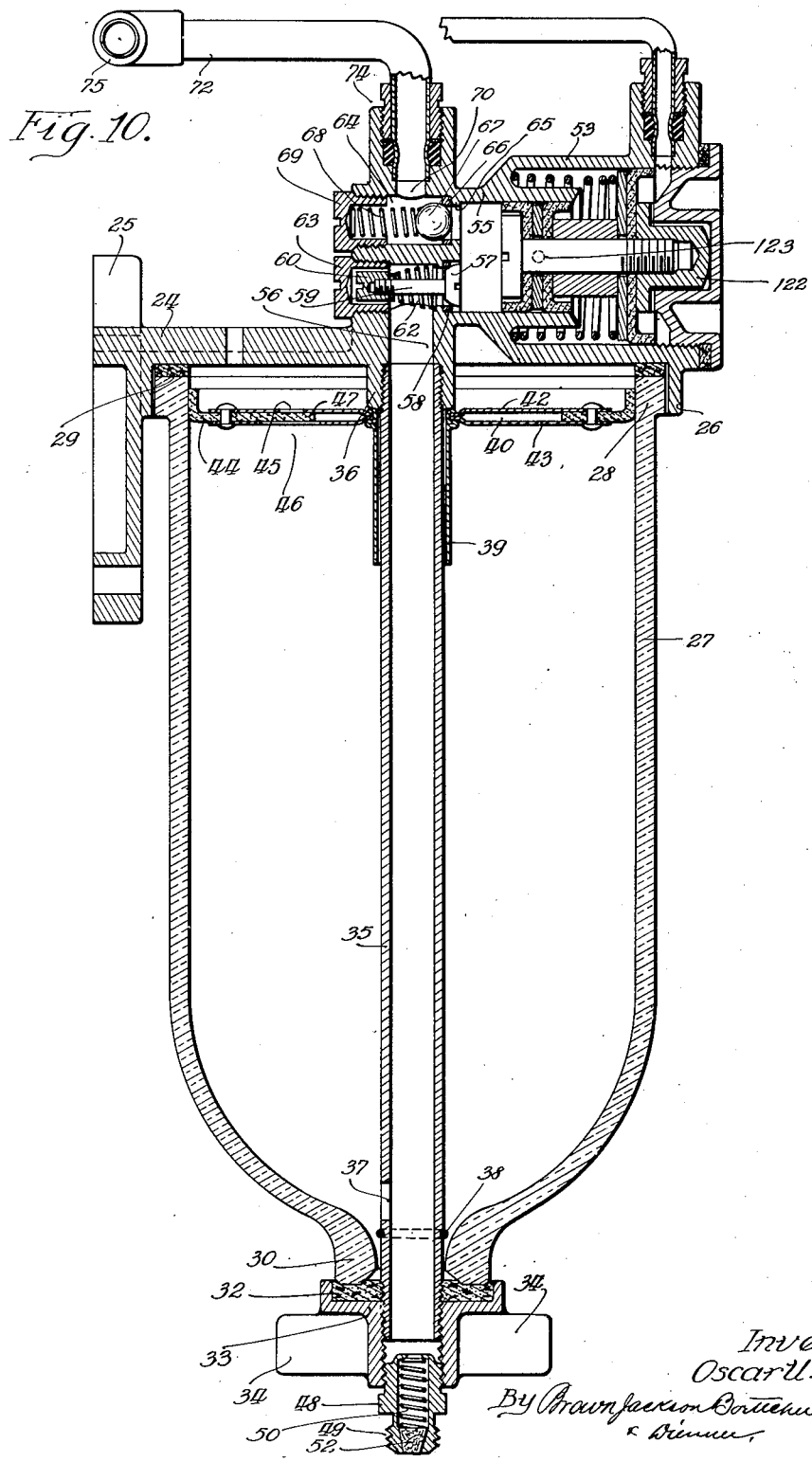

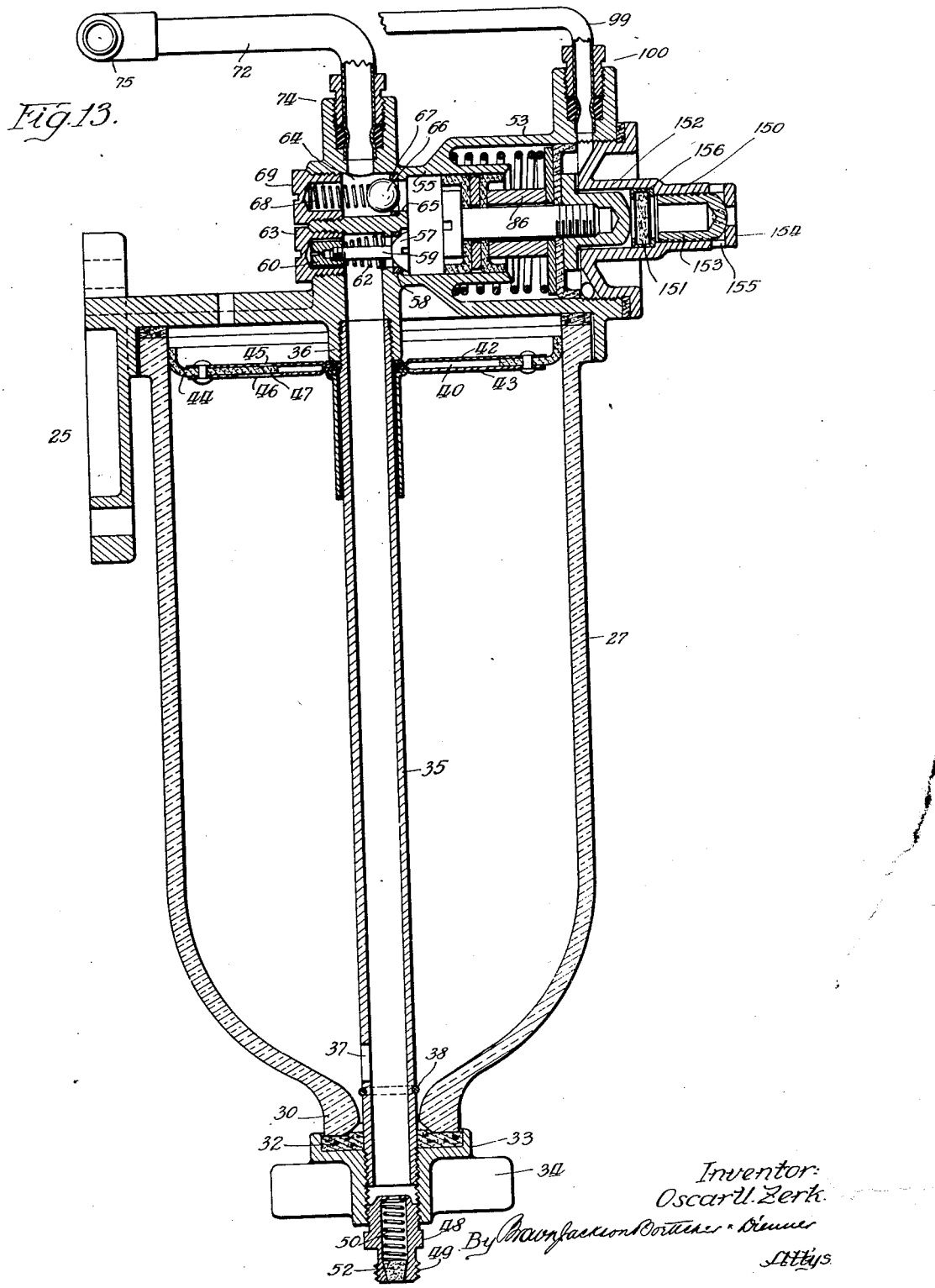

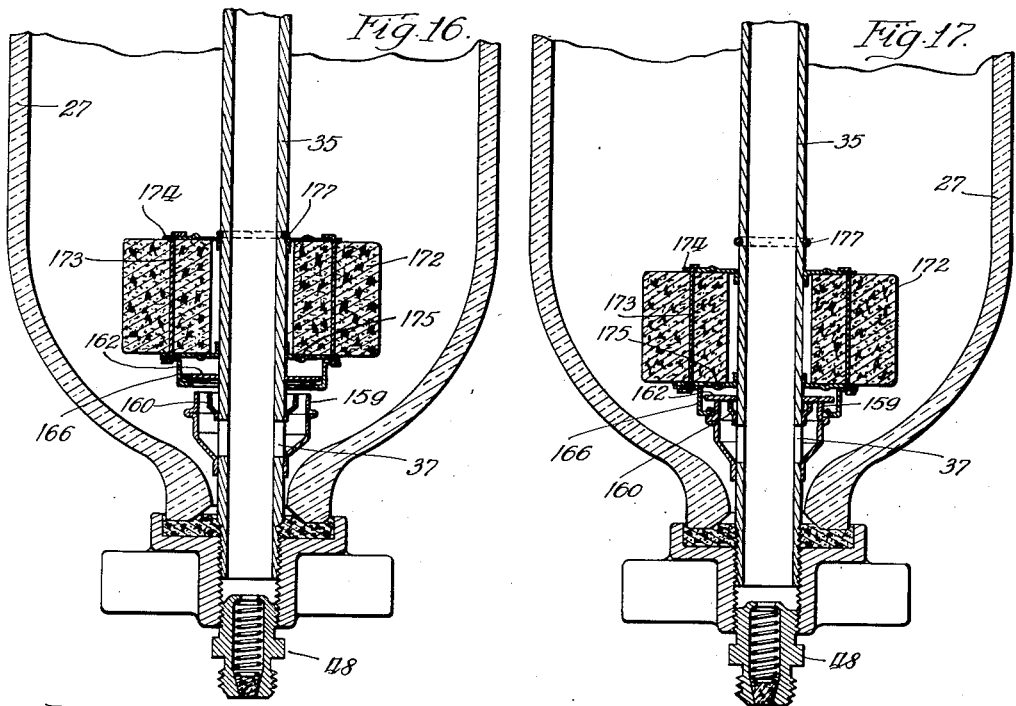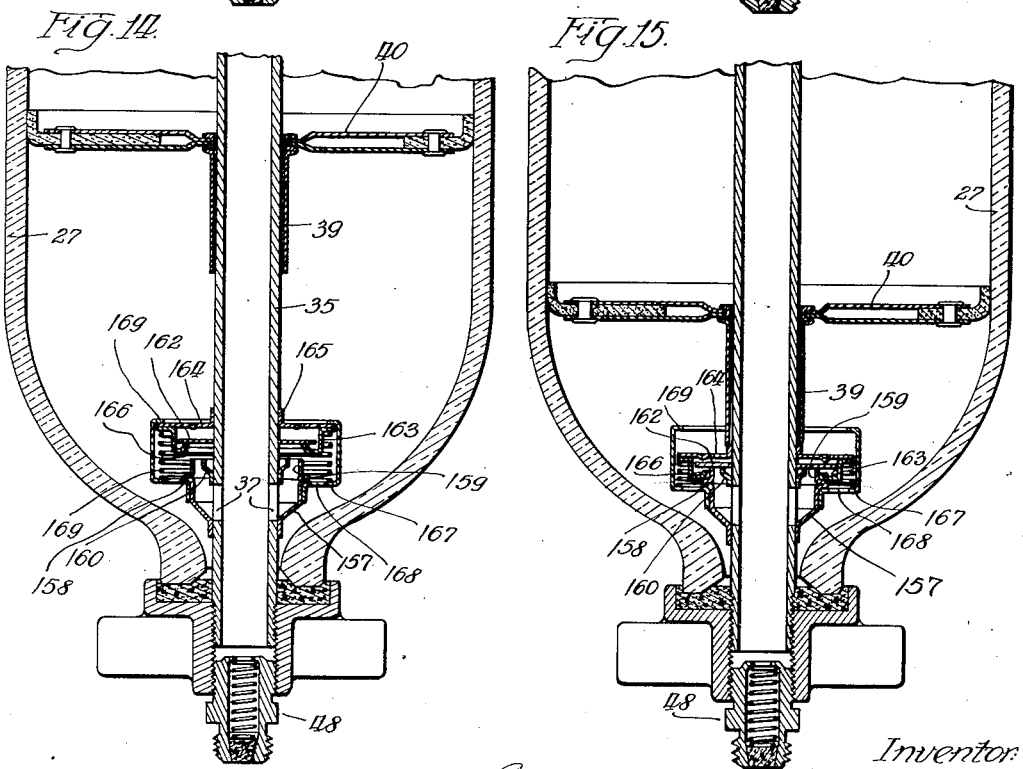

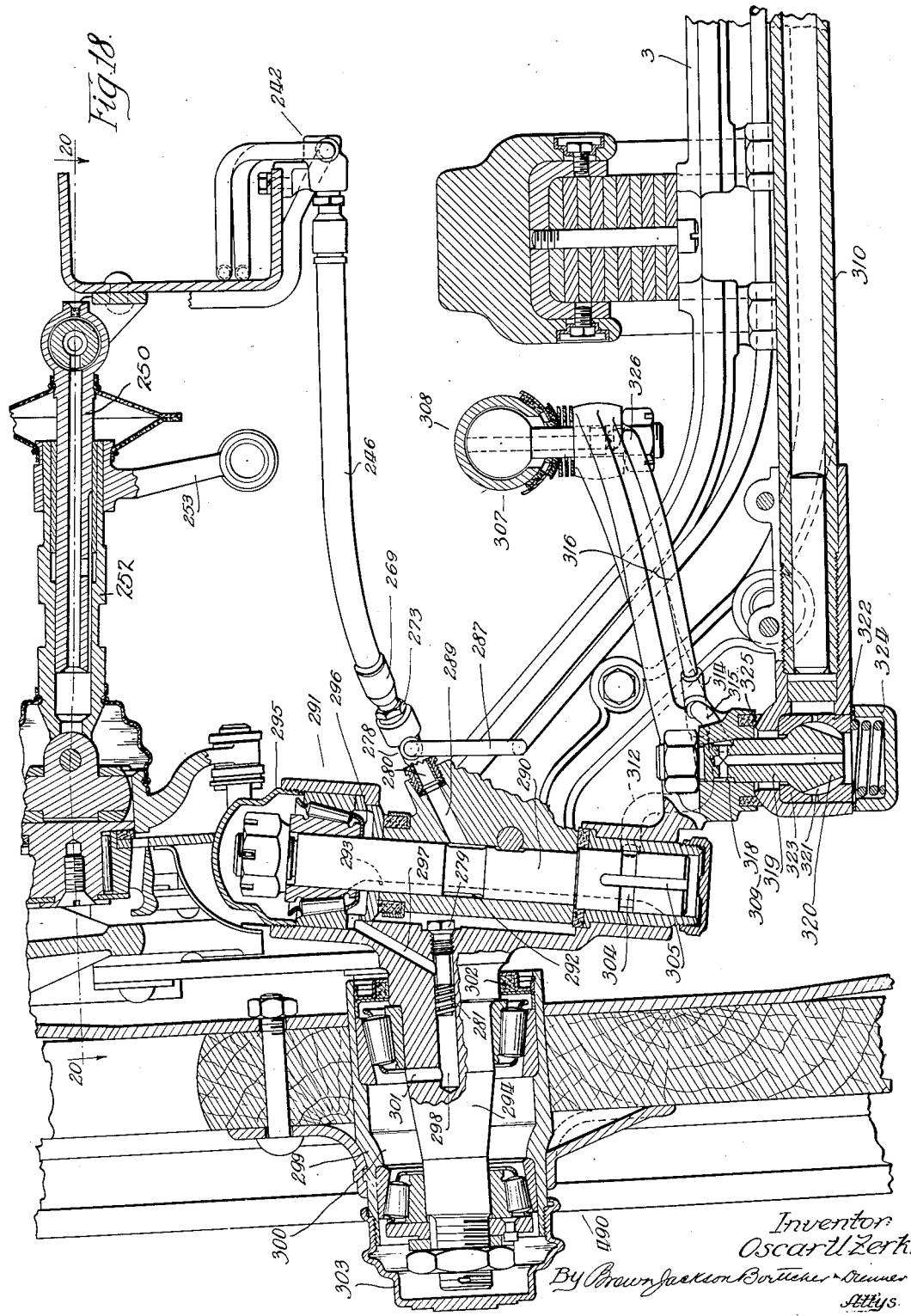

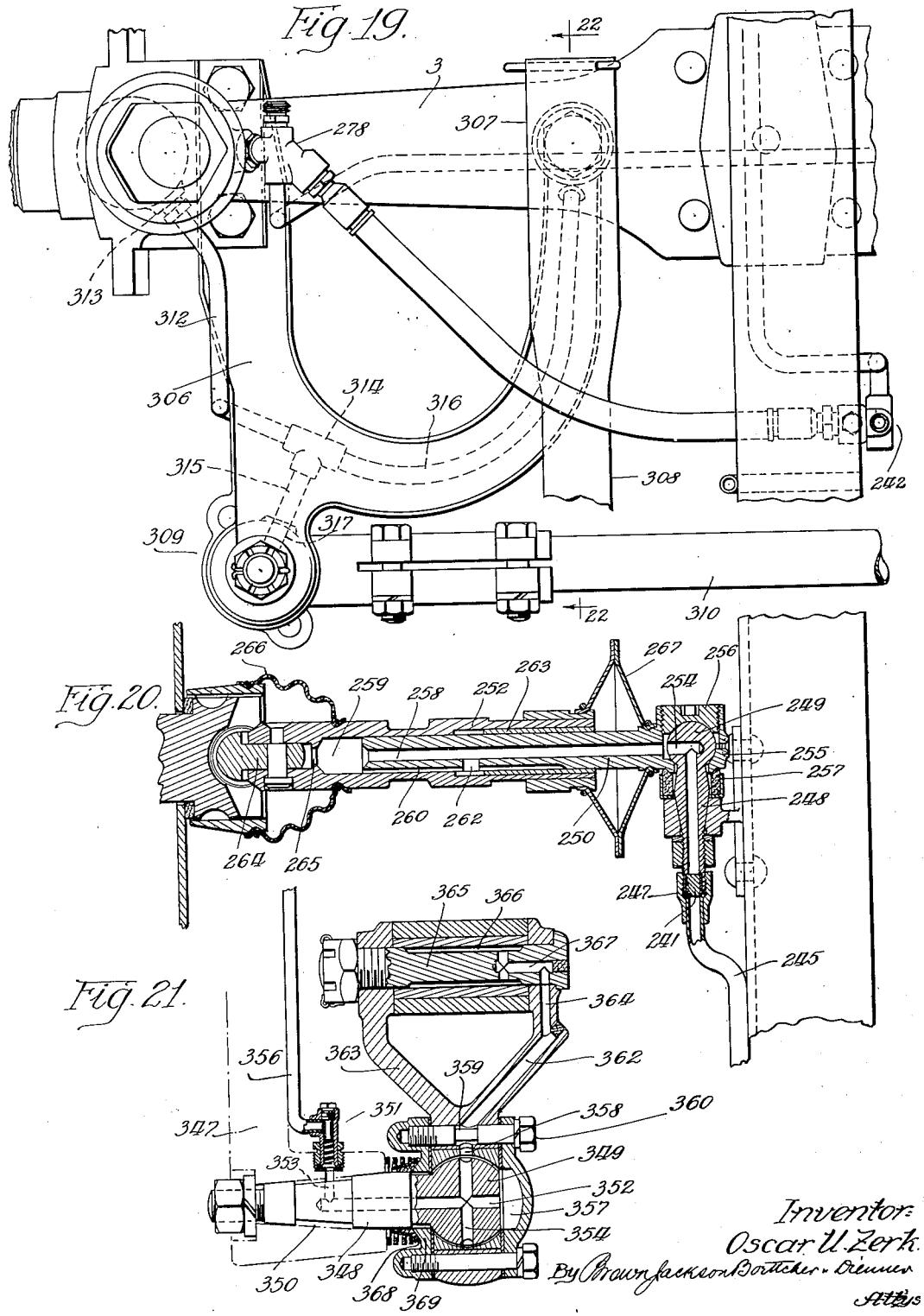

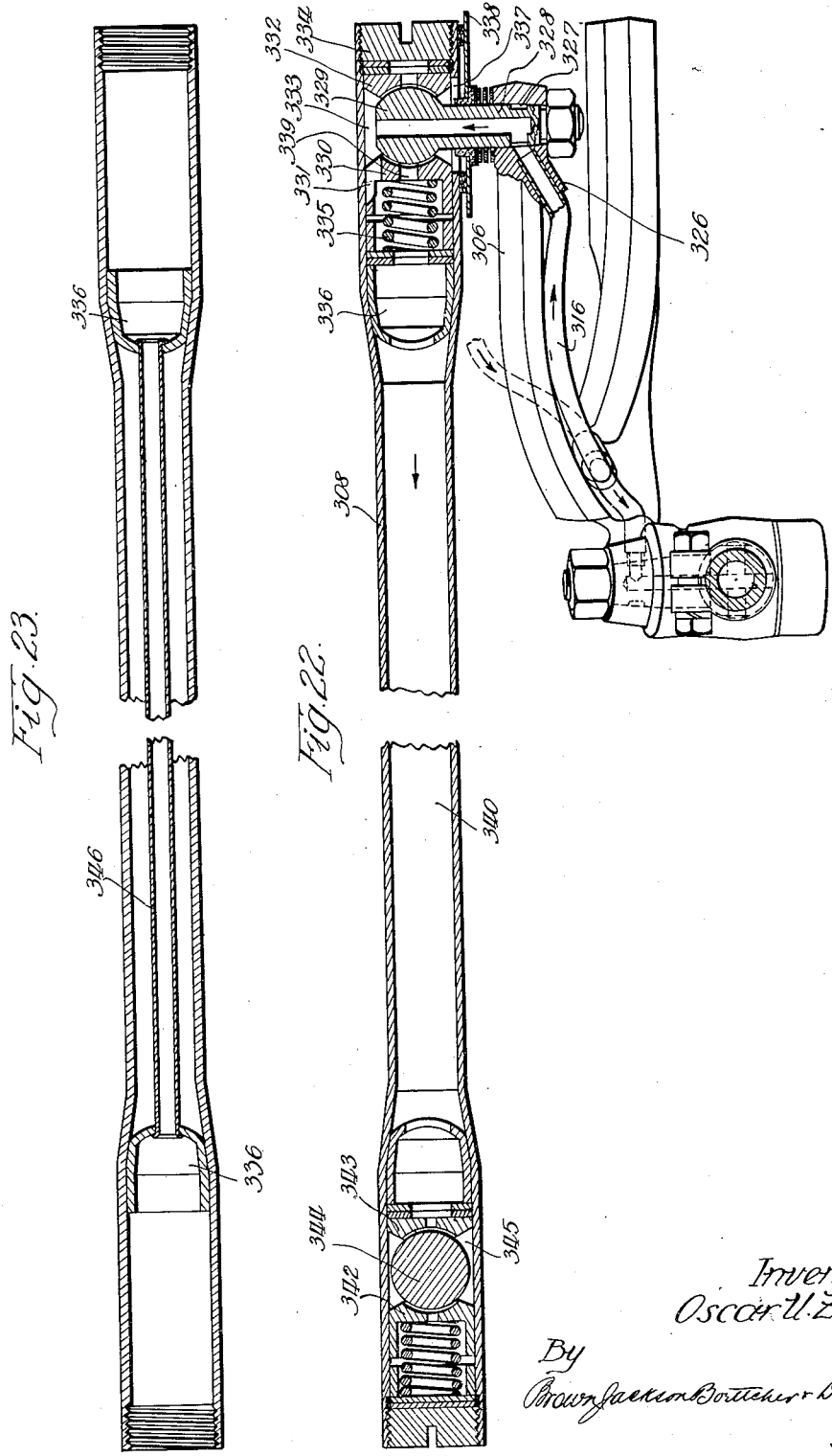

Nov. 27, 1934.  O. U. ZERK  1,982,093
CENTRALIZED LUBRICATING SYSTEM
Filed Sept. 21, 1929  17 Sheets-Sheet 12
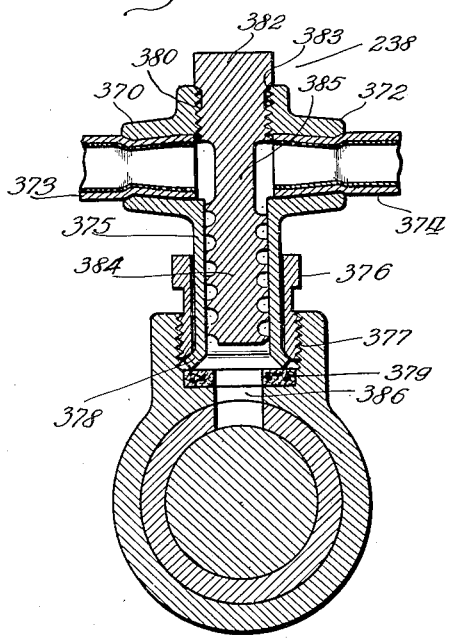
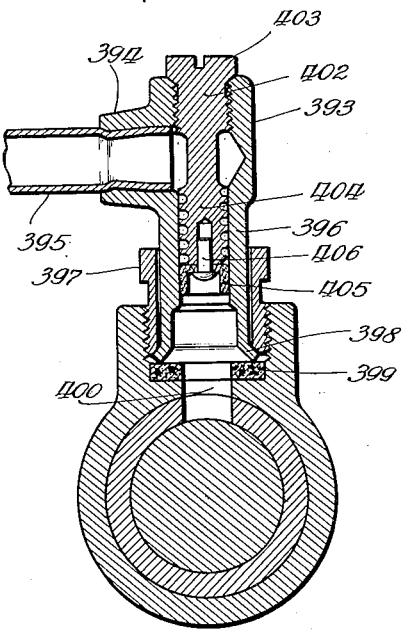
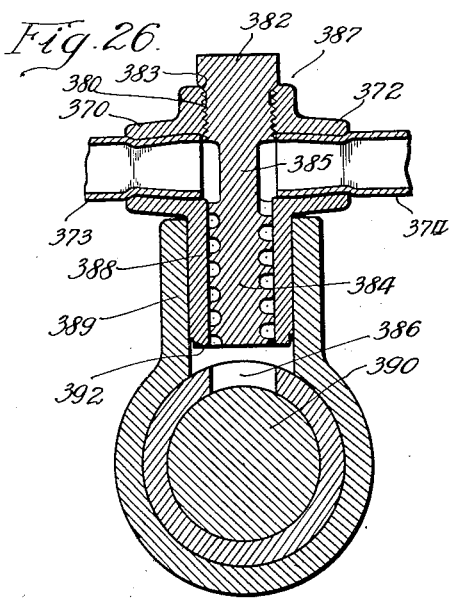
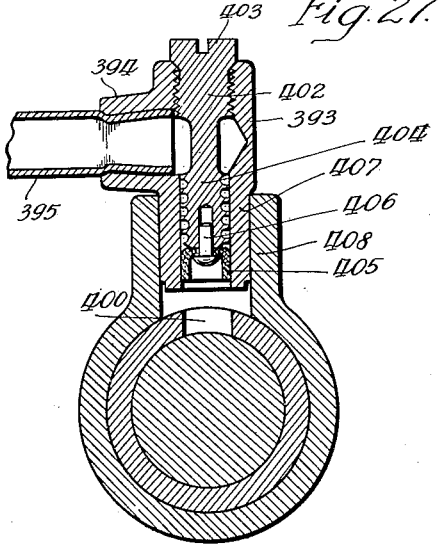
Inventor:
Oscar U. Zerk.

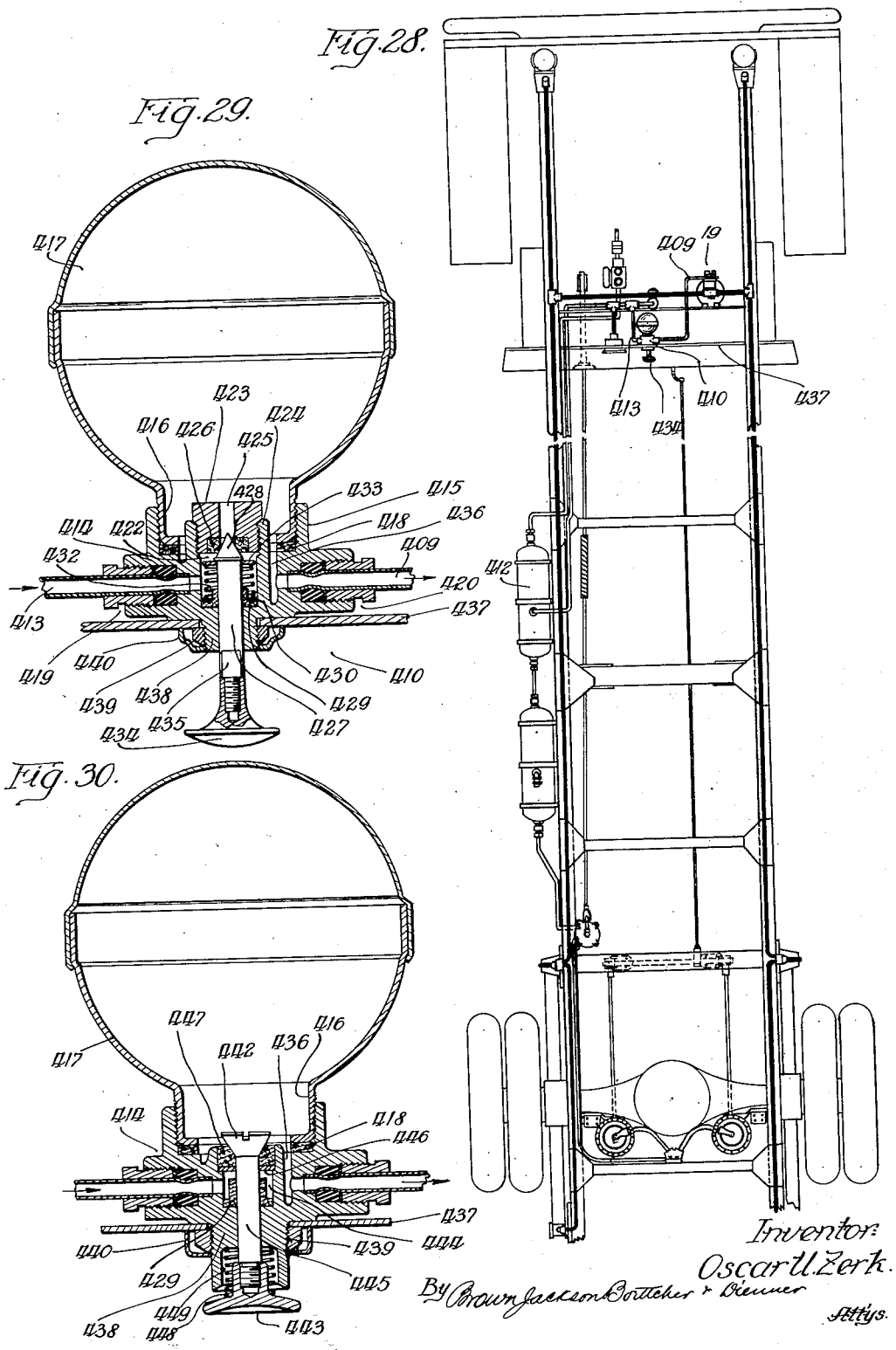

Nov. 27, 1934.    O. U. ZERK    1,982,093
CENTRALIZED LUBRICATING SYSTEM
Filed Sept. 21, 1929    17 Sheets-Sheet 14
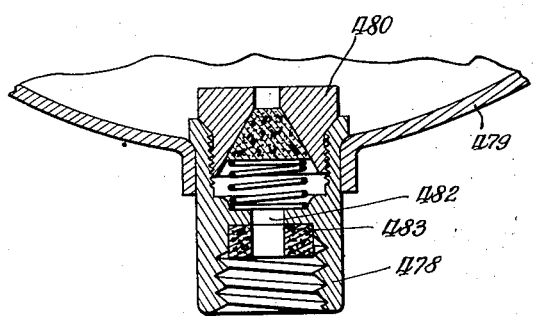
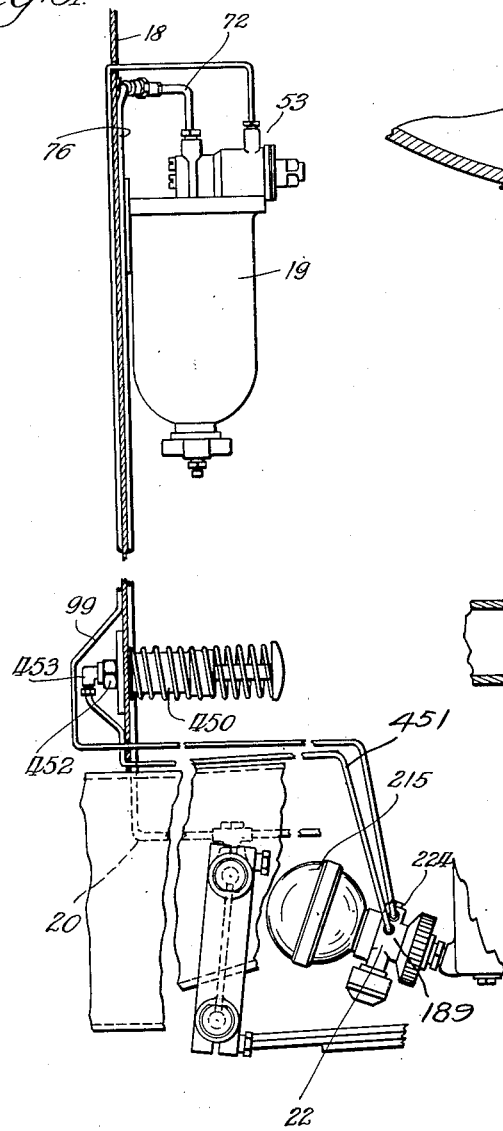
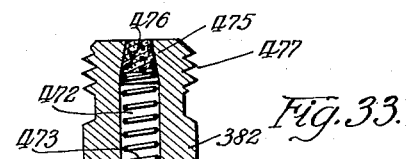
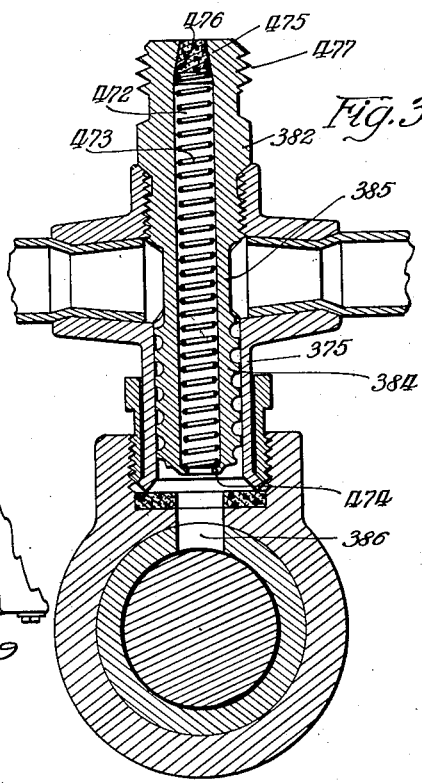
Inventor:
Oscar U. Zerk.
By Brown Jackson Boettcher & Dienner
Attys.

Nov. 27, 1934.  O. U. ZERK  1,982,093
CENTRALIZED LUBRICATING SYSTEM
Filed Sept. 21, 1929  17 Sheets-Sheet 15
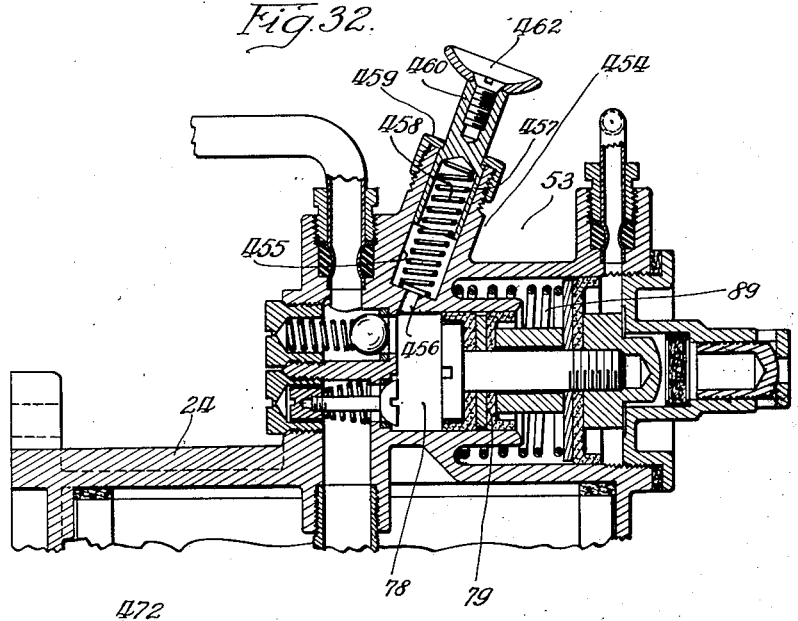
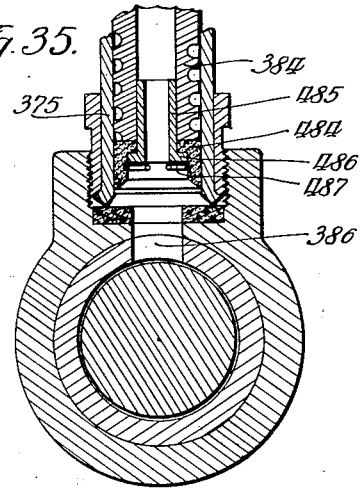
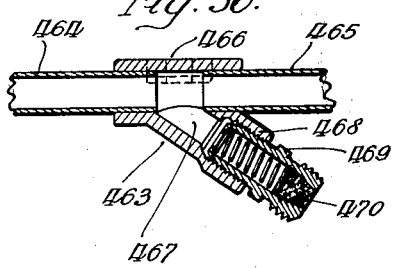
Inventor:
Oscar U. Zerk.

Nov. 27, 1934.　　　O. U. ZERK　　　1,982,093
CENTRALIZED LUBRICATING SYSTEM
Filed Sept. 21, 1929　　17 Sheets-Sheet 16
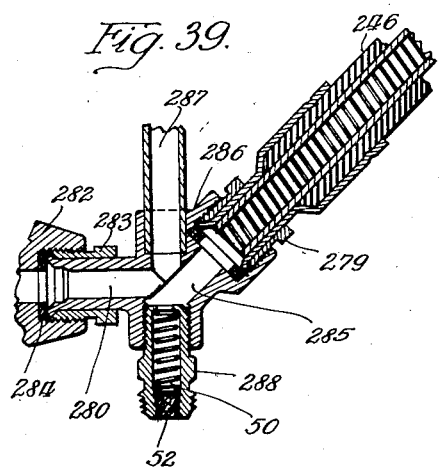
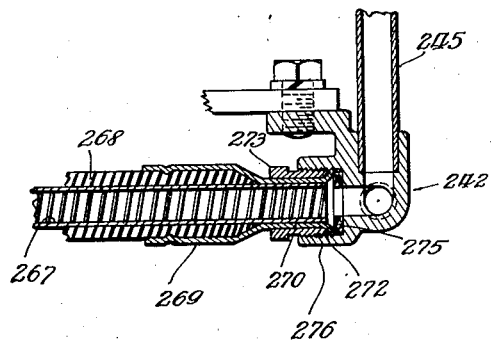
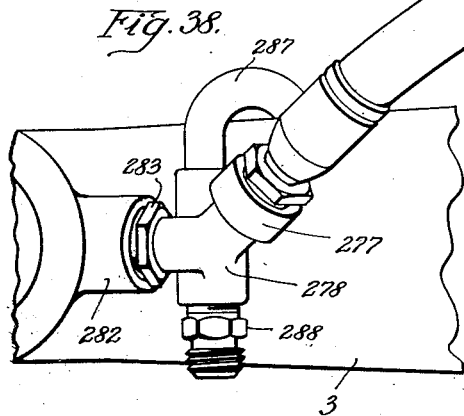
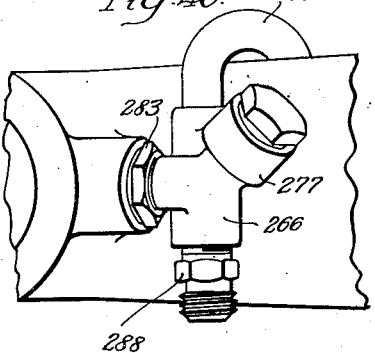
Inventor:
Oscar U. Zerk.
By Brown Jackson Boettcher & Dienner
Attys.

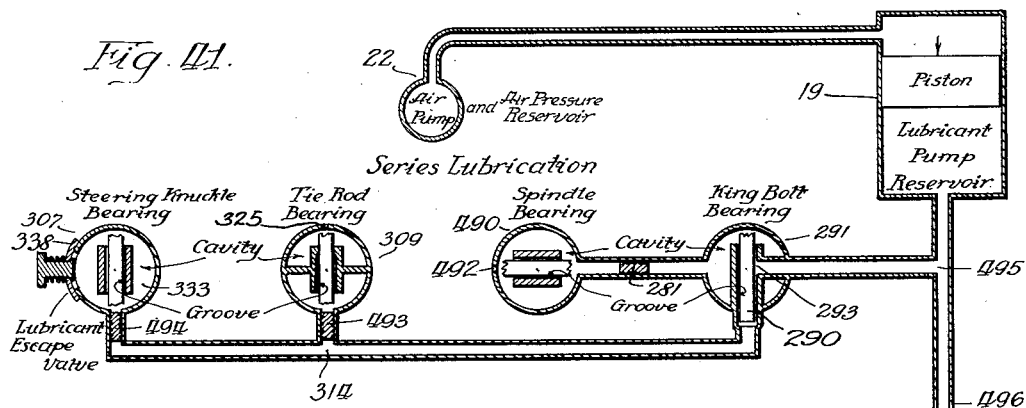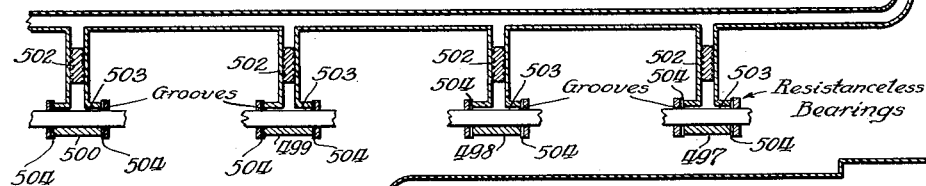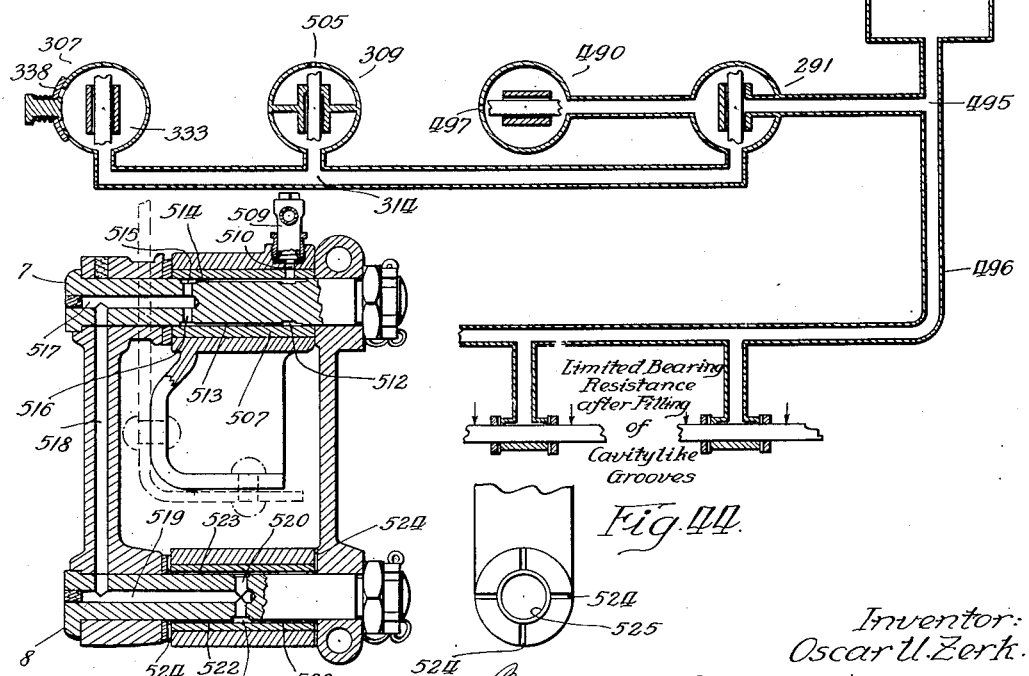

Patented Nov. 27, 1934

1,982,093

UNITED STATES PATENT OFFICE 1,982,093

CENTRALIZED LUBRICATING SYSTEM

Oscar U. Zerk, Chicago, Ill., assignor, by mesne assignments, to Stewart-Warner Corporation, Chicago, Ill., a corporation of Virginia Application September 21, 1929, Serial No. 394,363

40 Claims. (Cl. 184—7)

My invention relates to centralized lubrication and while it is particularly applicable to automotive work, more particularly to the lubrication of the chassis of vehicles, such as automobiles, tractors, gun carriages, war tanks, locomotives, aeroplanes and the like, it is also adaptable to industrial lubrication, that is to the lubrication of stationary machines, such as stamping presses, printing presses, textile machinery, shafting and the various types of machines and machine tools employed in modern industry.

Heretofore centralized chassis lubrication has employed oil. While oil is a good lubricant, it cannot be employed successfully for certain bearings of an automobile, such as the wheel spindles and the like where cavities adjacent the bearings must be filled and from which cavities it is customary to have the bearings derive their supply of lubricant. In many places such cavities are covered with leather or the like and cannot be made entirely leakproof. There are numerous other places in the chassis of an automobile and the like such as king bolt bearings, particularly where ball or roller bearings are employed, tie rod bearings, steering knuckle bearings, front wheel brake bearings, steering gear housing bearings, and the like, where such cavities are customarily provided. Due to the fact that grease is the best lubricant for these cavity surrounded bearings they have heretofore been designed for grease lubrication and even in those machines where a centralized system of chassis lubrication using a thin grade of oil is provided for the rest of the bearings, a separate hand-operated grease gun system is employed for such cavity surrounded bearings.

In such systems where there are from ten to fifteen chassis bearings depending upon grease lubrication by the use of a hand gun or the like, the operator is likely to depend upon the centralized lubricating system and to either overlook the grease lubricated bearings or he may gain the impression that the centralized chassis lubricating system takes care of all of the bearings of the car. The result is often a complete failure to lubricate the grease lubricated bearings.

The chief advantage in using grease instead of oil in centralized chassis lubrication is that grease will stay in place while oil flows. Hence grease does not drip from the bearings or from the pipe line system. Oil on the other hand tends to drip from the bearings or from the pipe line system and form pools of oil below the car which is highly undesirable. The use of grease also makes it possible to do away with check valves in metering units, particularly in resistance units.

However, with the great advantages which are possible with the use of grease for a centralized system of chassis lubrication, I find that grease has not heretofore been successfully used for centralized chassis lubrication. In large part this appears to be due to the difficulty of moving the grease through the inside of a relatively long pipe line. Due to the resistance of the pipe line there would be a relatively great variation in resistance to flow of the grease as between a bearing nearest the grease pump and a bearing remote therefrom, with the result that there would be a tendency for the grease to escape from the nearest outlet and very little would pass to the remote bearing.

Automatic systems for pumping oil into the pipe line system and into the bearings are known, and in these the pump delivers very small discharges of oil.

If air should become entrained in the oil it would tend to separate out by gravity, whereas if air becomes entrained in the grease, and this is not at all unusual, the extremely small displacement of the pump which is employed to pump the grease is rendered ineffective by the presence of such a bubble of air since the same cannot disentrain itself from grease. After such a bubble of air gets into the pump it is difficult to dislodge the same and until it is dislodged grease will not be drawn into the pump with the result that the entry of air into a very small displacement pump for grease will render such system inoperative.

The principal object of the present invention is to provide a centralized lubricating system, utilizing grease or very high viscosity oil for lubricating an automobile chassis or any other machine or machine tool. The system herein shown is particularly designed for the use of grease but is equally applicable to the employment of a high viscosity oil.

In considering a suitable mode for the employment of grease in a centralized lubricating system, there are a number of important considerations and requirements to be met.

It is undesirable to force the grease serially to the various bearings through a small, high-resistance, pipe line system, because of the friction to flow which is thereby presented.

It is an aim of my invention to avoid this difficulty, primarily by employing relatively large diameter tubing and to make the distribution as nearly equal as is possible within structural limitations and commercial practice, from the grease pump to the various bearings. In the preferred construction I secure this result by employing a manifolded delivery connection, for example, by delivering grease from the pump to a pipe line on each side of the chassis frame at a point intermediate the front and rear end of each side.

Another feature of my invention is to employ the free running grease disclosed in my copending application Serial No. 384,120, filed August 7, 1929. Another feature in reducing the friction of flow is to prepare the inside surface of the pipe line system to decrease the flow resistance, either in connection with the specially prepared grease or in connection with such grease as is known.

Another consideration in a system of this character is the desirability for positive displacement of a definite quantity of grease periodically. That is to say it is possible to distribute grease to the various bearings by forcing into the pipe line system minute amounts successively, but I consider it preferable to deliver periodically a definite relatively large charge of grease which will distribute itself to the various bearings as predetermined.

This positive discharge movement should be made relatively rapid and with sufficient power available to secure the desired movement of the grease.

In considering the means for obtaining such intermittent measured discharges of grease, it is of course possible to employ gearing between some moving parts and a final plunger which will deliver the grease but such a construction is subject to certain disadvantages, both because of cost and the necessary mechanical complications which are involved. Also, a slow movement of the final piston is highly undesirable since the purpose of the same might be completely defeated by a small leakage past the same.

I consider it advisable to have a definite rapid motion which is much less affected by leakage and which has a tendency to gain better distribution in the pipe line system.

The specific means herein disclosed involves the use of a small displacement air pump which successively discharges small volumes of air into an accumulating chamber which will be charged with compressed air at a value suitable for performing the discharge or displacement operation and when such accumulated volume of compressed air has been collected it is released from the accumulating chamber and applied to the work of displacing the lubricant into the pipe line system and to the bearings.

While the preferred means for compressing the air is a small compressor operated from the variations of fluid pressure in the shock absorber of the vehicle, it will be apparent that within the teaching of my present invention the air may be accumulated from any suitable source and the accumulated charge applied to the work of displacing the lubricant periodically.

In the distribution of the grease to the various bearings, I have developed two general modes of distribution. One is to employ cavities in conjunction with the bearings to be greased or lubricated, the outlets of the bearings being restricted so as to facilitate the retention of grease in such cavities. The second method of distribution is to insert resistance units of predetermined character in advance of such cavities so as to equalize substantially the pressure within the pipe line system and to secure equal emission at the various metering units where equal emission is desired into the cavities. In brief, I provide the resistance either in advance of the cavity or where from the nature of the bearing it is advisable to do so I place the resistance at the remote end of the bearing.

In further explanation of the above general methods, I shall hereafter point out refinements of the said methods of attaining distribution of the grease to the various bearings of the automobile or the like under the above two general schemes. Suffice it here to say that as a special or particular case of bearings having cavities or passageways of relatively large size with relatively free inlets, I may transmit lubricant through such cavities or passageways in series to other bearings whether the latter have restricted inlets or outlets.

In connection with bearings fed by grease or high viscosity oil through restricted inlets, that is with distribution resistances on the inlet side, my present invention provides certain highly important improvements. I have conceived the desirability of making the resistance passageways of such size that particles of dirt and the like will not clog up the same. To get sufficient resistance to make the resistance of the nearest outlet equal to a tight bearing at a remote point would, however, require an unduly long passageway and undesirably high resistance. Therefore, according to my present invention I reduce the resistance of the bearings to an extent that will make them less than that of a resistance plug of reasonable dimensions and relatively low resistance but having a passageway large enough to pass such particles of dirt as are commonly encountered in grease. This will be more specifically pointed out in the following objects, detailed description and in the claims.

In the development of a system and particularly an automatic system for utilizing grease as a lubricant throughout for chassis lubrication or the like, I have been forced to develop and provide improvements in detail extending to substantially all of the units and features of such a system, all of which will be more specifically pointed out in the following detailed specification and claims and to which I shall call attention generally in the more specific object hereinafter stated.

Another difficulty with the distribution of grease in a pipe line system is the stiffening or hardening of grease as now constructed, by low temperatures.

I have conceived the desirability of automatic centralized grease lubrication and have provided means to meet the cold weather situation as will be more fully set forth in detail and claimed hereafter.

An object of this invention is to transform a large number of motions or operations incident to the operation of a vehicle into a single motion or operation for securing a periodic action of a device in connection with centralized lubrication or the lke.

Another object is to accumulate a charge of compressed gas by a large number of separate compressing operations and to utilize this charge to perform a single operation, such as discharging grease into a pipe line. I may thereby reduce a large number of positive motions into a single rapid motion which is preferably impositive but may be made relatively positive by suitable design.

Another object of the invention is to compress air and irrespective of the amount of air compressed to press yieldingly a predetermined amount of grease or oil into the pipe line system leading to the bearings to be lubricated.

Another object of the invention is to compress air and after a predetermined amount of air has been compressed to employ such volume of compressed air to discharge a predetermined amount of grease or oil, such amount of grease or oil being entirely independent of the volume of air which is compressed.

Another object of the invention is to use any kind of automatic air pump with air pressure reservoir and with automatically opening outlet valve to operate when the pressure in the air reservoir has reached a predetermined quantity or pressure. Such automatically operated air pumps may consist of:

1. An air pump hydraulically connected to a hydraulic shock absorber.
2. An air pump mechanically connected to a hydraulic shock absorber or the like.
3. An inertia operated pump.
4. A pneumatically operated air pump.
5. An air pump driven from the speedometer shaft or from any revolving or moving part of the automobile.

Another object of the invention is to use any of the above named pumps with means for filtering the air and to employ means whereby the condensed water in the pump or oil reservoir due to humid atmosphere cannot enter the lubricant pump, nor clog nor freeze up any conduit or valve mechanism of the air pump.

Another object of the invention is to let the condensed water accumulate in the air compression chamber or reservoir without interfering with the action of the air pump.

Another object of the invention is to derive the power for operating the entire lubricating system from a fluid shock absorber, preferably of the hydraulic type.

Another object of my invention is to prevent any leakage of the shock absorber fluid when operating the air pump.

Another object of my invention is to connect the air pump to the shock absorber in such a manner that it will not interfere with the relative movements of axle and frame of the automobile, nor any of the other functions of the automobile.

Another object of the invention is to employ a type of air pump which will utilize only the beginning of the shock absorber movement, thus making the stroke of the air compressing pump independent of the amplitude of movement of the body relative to the axle, that is independent of the size of the bumps in the road.

Another object of the invention is to obtain substantially equal movements of the small air pump piston independently of the length or size of the shock to which the car is subjected.

Another object of the invention is to use only one of the two opposite motions of the hydraulic shock absorber in operating the air pump.

Another object of the invention is to provide a diaphragm for operating the piston of the air pump, this diaphragm being subject to the fluid pressure in the fluid shock absorber.

Another object of the invention is to move the piston of the air pump forward by one operation of the hydraulic shock absorber and backward by the opposite action of the shock absorber, thus eliminating springs.

Another object of the invention is to filter the air leading to the piston inlet and the air leading to the front portion of the diaphragm through the same air cleaner preferably attached to the air pump.

Another object of the invention is to connect the air conduit leading to the piston inlet and the front portion of the diaphragm to any source of clean air, as for example within the air cleaner which purifies the air leading to the carburetor.

Another object of the invention is to employ a transparent glass reservoir as a grease container.

Another object of the invention is to provide a follower in the transparent glass reservoir. This follower is arranged to be quickly interchanged if necessary.

Another object is to provide a glass reservoir which may be either of four forms, viz. 1, bottom supported in center; 2, bottom supported at circumference; 3, top suspended; 4, side supported.

Another object of my invention is to provide an air operated piston, preferably of the differential type in the grease pump.

Another object of the invention is to provide means whereby the air back of the air piston in the air operated grease pump will be reduced to substantially atmospheric pressure after the piston of the air operated grease pump has reached the end of its forward stroke. This object I may accomplish in any of the following ways. 1, by means of a plain air bleeder; 2, by means of an air bleeder using high viscosity zero oil; 3, by means of a snap valve mechanically actuated by the movement of the piston.

Another object of my invention is to close the outlet from the grease reservoir to the grease pump when the grease reservoir is substantially empty and the grease follower has reached the end of its movement. When the outlet is thus shut off the pump creates a partial vacuum instead of drawing air from the empty grease reservoir and injecting the same into the pipe line system.

Another object of the invention is to make the glass reservoir quickly detachable in case it is desired to refill the same with grease as by means of a paddle.

Another object of my invention is to supply means whereby the glass reservoir may be filled with grease without detaching the same from the automobile. This is preferably secured by providing a quick detachable and attachable means to connect a large grease container with the glass reservoir so that the reservoir may be filled from the large grease container.

Another object of the invention is in conjunction with the reservoir filling means to provide an automatic grease escape valve to prevent bursting of the glass reservoir or the passing of grease above the top of the follower when the glass reservoir is filled with grease.

Another object of the invention is to provide cavities adjacent the bearings, which cavities are filled with lubricant from the lubricant pump, these cavities taking the place of metering units.

Another object of the invention is to secure equalization of pressure in the distributing system by creating resistance at the end of each such cavity.

Another object of my invention is to employ as an alternative a resistance unit having a channel so large that the dirt or grit in the grease can pass through the channel without clogging the same, thus eliminating the use of screens.

Another object of the invention is to provide a construction of metering unit in which the resistance plug is quickly interchangeable without detaching the body of the resistance unit or the pipe line from the metering unit or the metering unit from the bearing.

Another object of my invention is to provide a pipe line system which is constructed of preassembled metering units and tubes, these units and tubes being then attached to the bearings without turning the metering unit body.

Another object of the invention is to provide a structure of metering units in which the bodies may be attached to the bearings by a pressed fit.

Another object of the invention is to provide a construction of metering units and pipe line assemblies which may be connected by press or swage fit.

Another object of the invention is to provide a construction of pipe line and metering units in which the pipe lines are soldered to the metering unit body.

Another object of the invention is as an alternative to connect the pipe of the pipe line system to the metering unit bodies by swaging or contracting the arms of the metering unit body upon the pipe line, preferably in such a manner that the tendency of the internal pressure is to increase the tightness of the joints between the parts.

Another object of the invention is to provide a construction of metering units in which the resistance plug is formed as a part of the closing plug so that the resistance plug can be inserted and removed from the outside.

Another object of the invention is to provide as an alternative construction a resistance plug having a relatively small diameter flexible portion between the outer plug portion and the resistance creating portion which flexible portion will facilitate the assembling of this plug in case the center lines of the thread and the cylindrical outside portion of the resistance plug are not in exact alignment.

Another object of the invention is to construct a metering unit so that the play between the outside diameter of the cylindrical portion of the resistance unit plug and the inside diameter of the resistance unit body is sufficient to permit convenient assembly, but at the same time small enough that substantially no lubricant will bypass the resistance during the lubricating period.

Another object of the invention is to provide a flexible cup-shaped check valve at the inner end of the resistance unit plug for use with oil whereby the self-expanding property of the leather cup is used to effect automatic closing without the use of a spring.

Another object of the invention is to provide a pipe line system having rigidly attached units for metering purposes with bends in the pipe lines to facilitate assembly of the pipe line system upon the chassis bearings or the like.

Another object of the invention is to provide a flexible hose connection capable of acting as a substitute for one or more universal joints. This is preferably secured by disposing the flexible hose in a substantially horizontal position to connect the frame and axle, the flexible hose being disposed in a hair-pin turn or bend.

Another object of the invention is to employ in connection with a centralized lubricating system means for reducing the resistance to flow of a solid or semi-solid lubricant, such as grease in either or both of the following methods, that is by using a specially prepared grease and/or specially prepared pipe line system.

Another object of the invention is to secure equal distribution of grease at the various bearings by using pipe lines with a relative large inside diameter, that is larger than five thirty seconds of an inch.

Another object of the invention is to provide means for facilitating the distribution of grease to the bearings under cold weather conditions.

Another object of the invention is to provide in a centralized lubricating system means for introducing grease at various points on the centralized lubricating system.

Another object of the invention is to provide in conjunction with a centralized lubricating system having an automatic lubricant supply device, connections at one or more points for introducing lubricant from an external source.

Another object of the invention is to provide in a centralized lubricating system having connected metering units, external connections to the metering unit.

Another object of the invention is to provide in connection with a centralized lubricating system having a centralized supply means for lubricants, local supply means for lubricants and means for preventing the locally applied lubricant from entering the pipe line system.

Another object of my invention is to use in connection with my air propelled grease or oil pump, means to let the air pressure escape after the lubricant propelling piston has reached the end of its forward stroke.

Another object of my invention is to use in connection with my air propelled grease or oil pump, air bleeders to let the air pressure escape after the lubricant propelling piston has reached the end of its forward stroke.

Another object of my invention is to use in connection with my air propelled grease or oil pump an automatic air escape valve which will be shifted to wide open position when the lubricant propelling piston has substantially reached the end of its forward stroke and which will be shifted to closed position when the same piston has substantially reached the end of its return stroke.

Another object of my invention is to use an existing supply of air pressure on motor vehicles such as used in connection with air operated brakes for operating my air propelled lubricant pressure pump by using a manual operated air valve to which an air pressure reservoir is connected where as large an amount of air under pressure can accumulate as is necessary to press the air propelled lubricant piston of the lubricant pump to the end of its forward stroke.

Another object of my invention is to use the hollow tie rod or the hollow steering gear connecting rod or both through which the lubricant under pressure can move from one bearing to another.

Another object of my invention is to use in connection with an automatic centralized lubricating system, at least one lubricant receiving nipple attached to the pipeline system through which the lubricant may be forced into the pipeline system by another source of lubricant supply.

Another object of my invention is to provide a system of combined series and parallel lubrication in a centralized system of chassis lubrication using grease.

Another object of my invention is to provide in a centralized system of lubrication using grease, means whereby the grease is first forced in a cavity surrounding or adjoining the bearing and from there into the bearing or vice versa.

Another object of my invention is to provide in a centralized system of lubrication using grease, means whereby two bearings which are lubricated in series are so designed that a resistance unit is placed between the two bearings but that no resistance unit is placed in front of the first bearing.

Another object of my invention is to provide in a centralized system of lubrication using grease, means whereby two bearings which are lubricated in series are so designed that the cavity covering the first bearing or the first bearing itself after being filled with fresh lubricant offers a resistance to the incoming grease which is greater than the resistance of the resistance unit connected with the second bearing.

Another object of my invention is to provide in a centralized system of lubrication using grease, means whereby two bearings which are lubricated in series are so designed that the second or last bearing or the cavity surrounding or adjoining the second or last bearing has means which automatically opens when the grease has reached a predetermined amount of pressure.

Another object of my invention is to provide in a centralized system of lubrication using grease, a combination of series and parallel lubrication whereby I use the following lubricating order:

1. Grease entering the king bolt bearing or cavity without resistance unit, with king bolt bearing or cavity offering substantial resistance to grease under pressure;

2. King bolt bearing or cavity connected to spindle bearing in series with resistance interposed between these two bearings;

3. King bolt bearing or cavity connected in series with tie rod bearing;

4. King bolt bearing or cavity connected in series with steering knuckle bearing.

Another object of my invention is to provide in a centralized system of lubrication using grease a combination of series and parallel lubrication whereby the bearings lubricated in parallel have resistance units interposed between pump and bearing whereby the resistance units are using resistance coils of relatively large throttling area permitting easy passage of relatively large grit, said resistance coils are of medium resistance which supply grease to bearings with substantially all resistance removed thus making the resistance of all bearings less than the resistance of the resistance units of medium resistance.

Another object of my invention is to provide in a centralized system of lubrication using grease, a shackle bolt whereby both bearings are lubricated in series in such a manner that the resistance unit of medium resistance and relatively large resistance area is placed before the first bearing same having a larger resistance to the incoming grease than the second bearing.

Another object of my invention as an alternative is to provide in an automatic centralized system of lubrication using grease, a combination of series and parallel lubrication whereby substantially no metering units are used whereby a relatively small amount of lubricant is fed to the bearings during the lubrication periods whereby all bearings or cavities surrounding or adjoining the bearings are so designed as to offer a medium resistance to the relatively small amount of grease fed to the bearings or their cavities.

Another object of the invention is to provide in conjunction with a centralized lubricating system having an air operated grease pump and an automatic air pump, a manually operable air pump for performing a lubricating operation at any time.

Another object of the invention is to provide in conjunction with an automatically operated grease pump, a manually operable grease pump to secure delivery manually independently of the automatic grease delivery means.

Further objects of the invention will be apparent from the following detailed description and the claims hereto appended.

Now in order to acquaint those skilled in the art in the manner of constructing and operating a system embodying my invention, I shall describe in connection with the accompanying drawings one manner of constructing and operating a system embodying my invention.

Throughout this specification like reference characters indicate like parts.

In the drawings, Figure 1 is a side elevational view partly in section of an automatic centralized lubricating system for distributing grease to the bearings, shown as applied to the front part of the chassis of an automobile.

Figure 2 is a top plan view of the automatic air pump unit;

Figure 3 is a vertical longitudinal section taken on the line 3—3 of Figure 2;

Figure 4 is a transverse vertical section taken on the line 4—4 of Figure 3;

Figure 5 is a vertical section, like Figure 3, of a modification;

Figure 6 is a transverse vertical section like Figure 4 of the modification shown in Figure 5;

Figure 7 is a side elevational view partly in sections of the reservoir and automatic air operated grease pump unit;

Figure 8 is a top plan view of the same;

Figure 9 is a front elevational view of an alternative reservoir and automatic grease pump unit with the air bleeder shown in vertical section;

Figure 10 is a vertical cross section taken on the line 10—10 of Figure 9;

Figure 11 is a side elevational view of the bleeder unit shown in Figure 9;

Figure 12 is a top plan view of the bleeder unit valve plug mounting;

Figure 13 is a vertical longitudinal section of an alternative form of reservoir and pump unit;

Figures 14 and 15 are vertical longitudinal sections to the lower part of a grease reservoir unit; Figure 14 showing the valve in raised position and Figure 15 showing the valve closed by lowering of the grease follower;

Figures 16 and 17 are like sectional views of a reservoir for heavy oil, Figure 16 showing the low level valve in open position and Figure 17 showing the valve in closed position by lowering of the float.

Figure 18 is a vertical transverse section of the front part of an automobile chassis, showing more particularly the spindle for the front wheel, the king bolt, the steering arm and drag link bearing, the tie rod bearing and the brake operating mechanism showing one form of my system as applied thereto;

Figure 19 is a top plan view of the construction shown in Figure 18;

Figure 20 is a horizontal section through the front wheel brake operating mechanism taken on the line 20—20 of Figure 18;

Figure 21 is a vertical section through a shackle connection between the frame and the springs of the vehicle;

Figure 22 is a longitudinal vertical section through the drag link showing the connections thereto;

Figure 23 is a similar section of a modified form of drag link;

Figure 24 is a vertical longitudinal section through a metering unit of my invention, for use in connection with grease;

Figure 25 is a similar sectional view of a modification of the same;

Figure 26 is a vertical longitudinal section through a resistance unit adapted for a heavy oil or the like;

Figure 27 is a similar sectional view of a modified form of the same;

Figure 28 is a top plan view of a vehicle having a centralized lubricating system thereupon provided with an independent source of compressed air;

Figure 29 is a vertical longitudinal section through a manual valve and reservoir unit;

Figure 30 is a similar view of a modified form of the same;

Figure 31 is a fragmentary side elevational view of a system provided with a manual pump supplementing the automatic pump for performing a lubricating operation at any selected time;

Figure 32 is a vertical sectional view through the lubricating pump which is air operated and provided with manual operating means for actuating the lubricating pump independently at any desired time;

Figure 33 is a longitudinal section through a metering unit embodying a resistance plug and embodying also a connection for lubrication of the bearings through an independent connection;

Figure 34 is a vertical longitudinal section of a grease gun having a coupling for cooperation with the coupling shown in Figure 33;

Figure 35 is a longitudinal section through a metering unit of the type shown in Figure 33 employing a check valve between the external connection and the pipe line connection; and Figure 36 is a longitudinal section through a valved inlet connection to the pipe line system for manual injection of lubricant.

Figure 37 is a longitudinal section through the fitting and one end of the flexible connection between the frame and the front axle;

Figure 38 is a top plan view of the fitting for attachment of the flexible tube to the front axle;

Figure 39 is a section through the fitting shown in Figure 38 and its connections;

Figure 40 is a view similar to Figure 38 of the fitting with the plug for closing the connection to which the flexible tube may be attached;

Figure 41 is a diagrammatic illustration of the system of lubrication showing some of the bearings lubricated in series relation, the others of the bearings lubricated in parallel relation employing resistance units in inlets to bearings which have otherwise free outlets;

Fig. 42 is a diagram similar to Figure 41 showing also some of the bearings in series relation for receiving their lubricant and others in parallel relation, the bearings all having end restricted inlets and the terminal bearings having sufficient restriction at the outlets to equalize distribution;

Figure 43 is a vertical section of the spring shackle bearings showing substantially no resistance in the bearing and having the lower bearing lubricated in series with an upper bearing; and Figure 44 is a fragmentary face view of the lower end indicating the relatively free outlet of the bearing.

Now referring to Figure 1, the front part of the automobile having a system of my invention applied thereto is shown partly in side elevation and partly in section. The frame 1 is connected by the spring 2 with the axle 3, this axle being a front axle. The spring 2 is connected to the axle 3, through the medium of a well-known spring clip 4, the front end of the spring is connected to the front horn of the frame 1 through the medium of the spring bolt 5. The rear end of the spring 2 is connected to the frame 1 through the medium of the shackle 6 and shackle bolts 7 and 8. Between the frame and axle there is provided the shock absorber 9 of known construction having two chambers 10 and 12 constituting cylinders and including pistons which are adapted to be differentially moved by a rocker not shown within the casing of the shock absorber mounted upon the shaft 13. The shaft 13 is connected by the arm 14 to a strut or link 15 the lower end of which is connected to the axle 3 or a part mounted thereupon.

The axle 3 is mounted upon the usual front wheels having pneumatic tires. These wheels are connected through spindles and king bolts to the axle, and steering mechanism is provided as will be more apparent from Figures 18 and 19. The frame 1 supports the usual fender 16 through the fender bracket 17. A bulk head or dash board 18 is mounted upon the frame 1 transversely thereof, dividing the engine compartment from the body compartment. This much is all known.

The lubricating system of my invention comprises three main units. The first unit is the reservoir and pump unit for lubricant shown at 19. The second is the pipe line system 20 with its various connections and metering units. The third unit is the air supply unit which in the form illustrated in Figure 1 is the pump and reservoir unit 22. Within my invention each of these units is optionally capable of modifications as will be more apparent hereafter. For example, the unit 19 might consist of two separate parts, viz. the reservoir part and the pump part, although as a part of my invention I combine these two into a single unit.

Also within my invention the character of the pipe line system may be varied as will be more apparent hereafter to secure proper distribution of the lubricant, for example, I may form cavities in conjunction with each of the bearings served by the system and place the restriction at the outlet or restriction at the inlet, or I may provide the bearings with special passageways to provide free flow for the lubricant in order to utilize low pressure within the pipe line system.

The air supply unit may be as I have shown herein an automatic air supply means operated for example from the shock absorber or it might be an inertia operated pump or any other suitable source of air supply, such as the air brake system for vehicles, in conjunction with means for periodically applying air pressure to the lubricant pump.

I shall now describe the first unit above mentioned, viz., the reservoir and pump unit.

*Reservoir and pump unit*

In the form of a reservoir and pump unit shown in Figure 7, I provide a frame 24 having a bracket or base 25 which is adapted to be secured as by bolts to the bulk head 18 as shown in Figure 1. A circular flange 26 depending from the frame 24 provides a seat for the glass reservoir 27. The mounting of the glass reservoir is shown more clearly in Figure 10. The upper margin of the glass reservoir 27 is thickened to provide a lip 28, the end of which engages the gasket 29 to make a substantially tight joint.

The lower end of the reservoir 27 is rounded in generally hemi-spherical form but has at the bottom thereof an apertured boss 30 which is engaged by the cork or similar yielding material gasket 32 held within the flange of a wing nut member 33. The wing nut 33 is provided with wings 34 adapted to be gripped by the hand for removing the reservoir if desired. This wing nut 33 is threaded upon the lower end of a hollow tension rod 35, the upper end of which is threaded to a socket 36 formed on the bottom side of the frame member 24.

The hollow tension rod 35 is in reality a suction tube for withdrawing from the reservoir 27 the grease or other lubricant which is contained therein.

A port 37 extends through the side wall of the tube 35 adjacent the lower end of the same and a split spring ring 38 is seated in a groove in the wall of the tube 35 below said inlet port 37 to serve as a stop for the sliding guide 39 of the grease follower 40. The guide 39 is formed of a piece of tubing having its upper end beaded upon the opposite side of the follower 40, this follower consisting of two circular sheet metal plates 42 and 43 gripping between their outer margins a cup leather 44. The cup leather 44 is held in position between the plate by rivets spaced about the periphery of the plates 42 and 43.

The plates 42 and 43 have registering apertures 45 and 46, the aperture 45 being relatively small and the aperture 46 relatively large. The cup leather 44 has a tongue or valve member 47 which extends between the two apertures. This tongue 47 is large enough to cover the opening 45, but is smaller than the aperture 46 so that the end of the tongue may drop down through the aperture 46 to provide a passageway through the follower 40 in case of sufficient difference in pressure between the two sides to bend the tongue 47 downwardly. The purpose of this valve is to prevent injury to the follower by suction when the contents of the reservoir 27 are substantially exhausted. Normally the follower 40 lies on top of the grease and atmospheric pressure upon the top of the same will, when grease is withdrawn from below the follower, force the entire follower downwardly in an even manner so that an air hole will not be formed in the grease.

The tongue 47 normally rests upon the grease and is held shut against the margin of the aperture 45 but if the follower is stopped by the stop 38 or otherwise prevented from following the grease the difference in pressure will open the valve 47 and permit air to pass through the apertures 45 and 46. The margin of the cup leather 44 engages the cylindrical walls of the reservoir 27. A suitable vent opening through the top wall of the frame 24 is provided to permit atmosphere to enter above the follower 40.

The lower end of the wing nut 33 provides a threaded socket for the filling nipple 48 which has a male thread at its upper end cooperating with the threads in the nut 33 and a coarse or multiple coupling thread 49 at its lower end for cooperation with a filling mechanism such as a flexible tube connected to a collapsible can of grease or the like. The intermediate portion of the nipple 48 is hexagon in shape. The upper margin of the nipple 48 is beaded over a compression spring 50 which at its lower end presses against a conical yielding valve 52 which may be made of cork or the like, seating in a corresponding tapered seat in the lower end of the nipple 48. The spring 50 is strong enough to prevent the entry of atmosphere through the nipple under the operation of the grease pump 53.

The inlet connection may be of the type shown in my copending application, Serial No. 395,878, filed September 28, 1929, in which there is shown a novel grease container with a suitable contact coupling for making connection to a cooperating contact coupling carried on the wing nut member 33. The frame of the grease pump 53 is preferably integral with the frame member 24.

A cylinder 55 which is the working cylinder of the grease pump communicates through an inlet passageway 56 with the suction tube 35 and thereby through the suction port 37 with the bottom of the reservoir 27. The passageway 56 terminates in a valve port which is controlled by the inlet check valve 57. The inlet check valve 57 comprises a hemi-spherical valve member seating against a yielding seat 58. The valve member 57 has a stem 59 threaded to receive a nut 60. The nut 60 and the head of the valve 57 are preferably slotted for assembly with a screw driver. A compression spring 62 extends between the nut 60 and an annular shoulder adjacent the valve seat 58 for normally seating the valve 57 against the seat 58. This spring 62 is disposed in a transverse bore, the right hand end of which forms the inlet port and the left hand end of which is closed by a hollow screw plug 63, the recess in which provides a guide for the nut or head 60 of the valve stem 59.

A similar transverse bore is provided above the inlet valve chamber to form the discharge valve chamber 64. The right hand end of the transverse bore terminates in a discharge valve port. An annular flange 65 provides a shoulder upon which is seated the annular ring 66 forming a seat of yielding character for the discharge check valve which is preferably a metal ball 67. A compression spring 68 is disposed between the ball 67 and the hollow nut 69 which closes the left hand end of the bore forming the chamber 64.

The screw 69 is recessed to form a spring pocket for the spring 68.

The discharge valve chamber 64 communicates through a passageway 70 with a discharge pipe 72, which pipe is connected to the frame of the pump 53 through a compression coupling 74. This compression coupling 74 comprises a seat for the end of the tube and above said seat there is provided a counterbore in which I dispose a deformable ring which may be made of rubber or the like. A hollow screw plug embracing the pipe is threaded into the upper end of the socket and compresses the deformable ring. This compression may constrict the pipe so as to form a shoulder at this point preventing the pipe from being pulled out or pushed out by pressure. If desired, the constriction in the pipe may be performed before the assembly of the coupling.

The pipe 72 is connected to a T 75, the other arms of the T going to each side of the chassis frame to pipes 76 and 77 as may be seen in Figure 9.

The frame of the pump 53 provides also a pumping cylinder 78 in which the plunger 79 is adapted to work. This plunger 79 comprises a pair of cup leathers 80 and 82 facing in opposite directions with a plate 83 interposed. A stem 84 having a head 85 thereupon passes through the cup leathers and the plate 83, this head forming a plate or follower for the cup leather 80.

A collar 86 preferably of metal lying upon the stem 84 is held against the rear cup leather 82 and forms a follower for the same. The stem 84 is connected to the motor piston 87 which motor piston plays in the motor cylinder 88 which is formed integrally with the cylinder of the pumping element. An annular spring pocket for spring 89 surrounds the inner or pump piston and forms an extension of the motor cylinder 88. This spring 89 tends to throw the motor piston 87 and the pump piston 79 which is rigidly connected to it to the right as viewed in Figure 7. The motor piston 87 comprises a cup leather 90 which is held between a plate 92 on the left and a follower plate 93 on the right, which follower plate 93 is threaded upon threads formed upon the stem 84. The front plate 92 bears against the collar 86 with an interposed washer 94 of leather or like yieldable material, this washer 94 forming a gasket embracing the stem 84 and sealing off any escape of air axially along the stem 84 when air is admitted to the clearance space 95 on the right of the piston 87.

The open end of the cylinder 88 is closed by a head member 96 screw-threaded into the open end of the cylinder with a sealing gasket 97 between the edge of the cylinder and the flange of the head 96.

The head 96 bears an automatic exhaust valve 98 to permit the discharge of air from the cylinder after the differential system has made a discharge stroke for discharging grease through the pump into the pipe 72.

The clearance space 95 is connected to an air supply pipe 99 through a suitable compression coupling 100, which coupling comprises a socket and passageway formed as an integral part of the cylinder 88. The socket being formed on the cylinder permits the head 96 to be removed without disturbing the connections of the air supply pipe 99.

The automatic exhaust valve 98 comprises a housing 102 forming an extension of the head 96. This housing 102 has a cylindrical wall for guiding the cage or barrel 103 which carries an exhaust valve member 104. The outer end of the housing 102 has an exhaust port 105, the inside of which terminates in a yielding valve seat 106 defining a valve port. The valve member 104 has a flat bottom portion adapted to engage said seat 106 and has a cylindrical side wall portion 107 terminating in a flange 108, this flange 108 lying within the barrel or housing 103 which has a flange at 109 cooperating with the flange 108. The stem 84 has an extension 110 of reduced diameter, upon the outer end of which there is mounted a cap 112, this cap extending into the hollow valve member 104 and tending when the pistons are completely at the right to push the flat bottom portion of the valve member 104 against the seat 106 to close off the same.

The opposite end of the cap 112 provides a shoulder which is adapted to cooperate with the inwardly extending flange 113 of the cap member 114 which forms a head for the cage or barrel member 103.

This head is a hollow screw plug embracing the rod 110. The inner end of said head 114 provides an abutment for the compression spring 115 which normally holds the flange 108 of the valve member 104 against the flange member 109 of the cage 103.

The barrel or cage 103 has a sharp bead 116 extending outwardly and this bead is adapted to cooperate with a pair of spring pressed plungers 117 which are held in hollow plugs 118. The plugs 118 have recesses therein forming spring pockets for the springs 119 that bear against the heads or the inner ends of the pins 117. The pins 117 are guided in sleeves 120, which sleeves are preferably pressed into the open ends of the plugs 118 and held therein by shoulders or lugs struck up from the edge of the corresponding plugs 118. The heads of the pins 117 prevent the escape of such pins from the sleeves 120.

The operation of the device shown in Figure 7 will now be apparent. When a charge of compressed air is admitted to the clearance space 95 in the air cylinder, through the pipe 99, the valve 104 being held against its seat 106 by the pressure of the compression spring 89, seals off the exhaust port 105. The air then drives the piston 87 with its connected pumping plunger 79 to the left to make a discharge stroke driving the contents of the pumping cylinder past the discharge check valve 67 and into the pipe 72.

As the stem 110 moves toward the left under the influence of the air pressure driving the differential pistons, the head 112 on the end of the stem engages the flange 113 toward the end of the stroke toward the left. The valve applying spring 115 holds the valve 104 against its seat 106 and also the internal pressure tends to hold said exhaust valve tightly to its seat. When the rear end of the cap 112 engages the flange 113 it begins to move the cage or barrel 103 to the left forcing the pins 117 outwardly against their springs 119. This takes up nearly all of the play which exists between the flanges 108 and 109 on the valve and on the barrel 103 respectively and just after the bead passes over center with respect to the pins 117 the flange 109 would begin to engage the flange 108 to pull the valve off its seat but normally passage of the bead under the plungers 117 snaps the spring cage 103 to the left and the action of the spring pins 117 causes the cage 103 to snap ahead of the nut 112 and causes the flange 109 of the cage to engage the flange 108 of the valve to snap the valve open. The exhaust valve is thereby opened with the snap action. The air pressure in the space 95 immediately flows down to a point where the spring 89 forces the differential pistons to the right. This motion proceeds until the cap 112 engages the bottom of the valve member 104 and forces the cage 103 to the right far enough to carry the bead beyond the center line of the spring pressed pins 117, whereupon the valve cage 103 snaps to the right closing the valve 104 against its seat 106.

The stroke of the pistons toward the right will normally not be made rapidly in view of the suction which is created in the pumping cylinder 78 by the movement of the piston, which suction draws in a charge of grease from the reservoir 27.

The periodic pumping of grease from the reservoir 27 and discharge of the same through the pipe 72 may thus continue until the follower 40 is drawn downwardly by the shrinkage in the volume of the grease to a point where the guiding sleeve 39 overlies the opening 37 cutting off the suction passageway and tending to prevent the suction stroke from being completed. Since the suction stroke is made only by the compression spring the compression spring may be so proportioned that it cannot make a suction stroke if the intake 37 is cut off. The succeeding discharge of air into the motor chamber will be ineffective to cause a discharge stroke as the suction stroke has not been completed.

Now it can be seen that in normal operation of pumping, the exhaust of air is dependent upon the completion of the discharge stroke and the effective pumping of the pump is dependent upon a complete return stroke or suction stroke. This form of exhaust valve has the virtue that if the grease is slow in moving on the discharge stroke the pump will continue to press upon the pumping plunger to discharge grease until the stroke is actually made or the retained air is no longer able to move the differential piston.

I shall now show in connection with Figures 9 and 10, a form of pump embodying a timed bleeder for blowing down the air pressure in the motor cylinder to accomplish the purpose of an exhaust valve. The differential motor pump piston structure as shown in Figure 10 is substantially identical with that described in connection with Figure 7, the stem 84 however terminating in a cap nut 122 which holds the elements of the two pistons together. It is to be observed that there is an opening through the side walls of the spring pocket 88 as indicated in the dotted circle at 123 for communication with atmosphere of the space between the two pistons.

The head for the motor cylinder shown in Figure 10 is a plain head member threaded into the end of the motor cylinder and having a recess for receiving the cap nut 122, the head being otherwise formed to reduce the clearance space between the head and the motor piston.

The air supply pipe 99 has connected thereto as shown in Figure 9 the blow-down valve unit 125 which comprises a valve housing 126 of generally T or cross formation, the pipe 99 being cut and the ends inserted in pockets 127 and 128 and soldered or otherwise sealed thereinto. The top of the valve housing 126 has an apertured and threaded lug 129 which is closed by a hollow plug 130. This plug has a recess 132 in which a small compression spring 133 is seated.

A quick release valve 134 is adapted to engage the inner end of the hollow plug member 130 to shut off communication with the outside of the same. The spring 133 normally holds said valve 134 in depressed position where it is away from its seat, which seat is formed on the end of the hollow plug 130. The valve 134 has a stem 135 which extends upwardly through the central guiding opening in the top of the plug 130. The stem 135 is preferably formed of brass although other metal may be employed. The upper end of the stem 135 is drilled to produce a relatively thin wall and this wall is thereupon pinched, as shown in plan view in Figure 12, to provide the lugs 137, preventing the stem 135 from passing through the hole in the plug 130. In other words these lugs form ears to hold the valve stem from slipping through the plug and forming a simple manner of making a head on the end of the pin. The valve 134 preferably has a yielding face and is held only a short distance away from its seat so that as soon as any substantial pressure is admitted to the pipe 99 this valve will immediately be blown to its seat and held thereagainst until the pressure drops to a predetermined degree as may be selected by proper proportioning of the spring 133, whereupon the spring 133 pushes the valve 134 down and permits the free escape of air through the clearance between the stem 135 and the hole in the plug 130.

The lower end of the valve body 126 has the hollow stem 138 extending downwardly. The upper end of the stem is threaded to cooperate with a cup member 139. The upper end of the cup member seats against the conical face 140 to form an air-tight joint. The lower end of the stem 138 has an enlargement 142, the outer surface of which is provided with a helical groove forming a resistance passageway. The bottom portion of the cup has a cylindrical wall closely embracing the enlargement 142.

An internal groove 143 is formed in the cup member above the resistance passageway and an external groove in the stem member at 144 cooperates with the same to form a small annular chamber for liquid. This chamber communicates by way of a side drilling with an outlet passageway 145 leading to atmosphere. The chamber 144 is filled with oil or a thin non-freezing liquid which fills the lower end of the bore of the stem 138, the helical resistance passageway and the chamber 144 below the side outlet to the atmospheric passageway 145. Now it can be seen that if compressed air is admitted to the pipe 99 the first action will be to blow the quick release valve 134 to its seat, closing off the blow-down passageway between the stem 135 and the plug 130. The pressure of the air is exerted upon the motor diaphragm, tending to drive the same against the pressure of the spring and forcing grease out of the cylinder 78 into the discharge pipe 72. At the same time the air pressure begins to drive the body of oil out of the bore 146 upwardly through the resistance passageway and into the chamber 144.

The air tends to follow the same. It is much harder to drive liquid through a restricted passageway than it is air because of the greater friction and adhesion of the same to the walls of the passageway. After the liquid has passed through the restricted passageway air follows and bubbles up through the liquid in the chamber 144, escaping through the atmospheric passageway 145 to a point where the pressure is sufficiently reduced to let the quick release valve 134 open and blow down the pressure to atmospheric. This, of course, permits the motor piston to make its return stroke under the influence of the spring 89 and make the suction stroke of the grease pump.

As a permissible variation of the above construction the blow-down passageway or resistance passageway may be formed as a part of the pump structure as shown in Figure 13. In this case instead of employing the liquid to delay the blowing down of the compressed air in the motor chamber, I provide an extension 150 upon the central boss 152 of the motor cylinder head and in said extension I provide a cylindrical bore in which a hollow resistance plug 153, having a helical resistance passageway of relatively great length and small cross-sectional area, is seated. The outer end of the housing 150 comprises a head 154 which is provided with radial atmospheric openings 155. Immediately ahead of the resistance plug 153 I interpose a filter 151 preferably held between screens in a circular double flanged ring 156. The filter 151 prevents any particles which would clog the helical passageway from passing thereto.

In all other respects the embodiment of Figure 13 is like that shown in Figure 10.

In this type of construction the application of compressed air through the motor piston begins to force the motor piston to the left to make the discharge stroke of the pumping piston and at the same time the air begins to leak through the filter 151 and the resistance passageway about the plug 153 to atmosphere. The leakage of air should be relatively slow but this is permissible since operations of the motor and pump mechanism are performed only at intervals corresponding to something like fifty miles of road travel of the automobile.

An improvement upon the suction cut-off employing the valve sleeve 39 and the suction part 37 is shown in Figures 14 and 15, employing a lift valve which may be made fluid tight. In this construction the hollow tube 35 which serves both as a tie rod for supporting the glass reservoir from the bottom and as a suction pipe has the follower 40 guided on the sleeve 39 in the same manner as described in connection with Figure 10. The tube 35 has a pair of openings 37 below which an outer shell 157 is mounted. This shell closely embracing the tube 35 below the opening 37, has an outwardly facing bead 158 along its side, the upper edge 159 forming one side of a double bead valve seat. The inner bead of the valve seat is formed by a similar shell 160 which is necked down to embrace the tube 35 above the opening 37.

These shells are soldered to the tube to form fluid-tight connections. The upper ends of the shells are cylindrical and extend substantially co-axially with the tube 35, the upper edges being substantially in the same transverse plane to form a double bead valve seat. A light annular disk valve 162 is carried in a cage 163, the cage comprising a top plate 164 which has a collar 165 sliding on the outer walls of the pipe 35 and being guided thereupon. The body of the cage 163 is formed by a dished or cupped plate 166, the bottom of which is cut out at the center and the edges of the bottom turned up to form a flange of a diameter greater than the outer bead of the double bead valve seat. The valve disk 162 normally is held upwardly on said flange 166 above the valve seat. A valve spring cage 167 has openings in its bottom wall 168 to permit the entry of grease or other lubricant upwardly inside the cage 67 and through the annular valve port defined by the double bead valve seat.

The spring cage 167 has a cylindrical side wall housing the compression spring 169, the upper end of which engages the flange formed on the valve cage member 166 to hold the valve cage and valve 162 in raised position. The spring cage 167 has an inturned flange 169 at its upper end for limiting the upward travel of the valve cage 163.

Now it will be seen that normally the lubricant enters the opening 168, passes upwardly through the annular valve port through the opening 37 and pipe 35 to the pumping cylinder. When the follower 40 and its guiding sleeve 39 are drawn downwardly by the diminution of the supply of grease in the reservoir, the guiding sleeve 39 bears down upon the collar or flange 165 as shown in Figure 15, lowering the valve cage 163 against the pressure of the spring 169 and permitting the valve disk 162 to rest upon the double bead valve seat closing off the suction passageway.

The valve disk 162 may be made of relatively yielding material, such as empire cloth if desired, or it may be a metal disk. It is permissible within my invention to have the disk held relatively rigid, the mechanism which I have shown being a refinement to permit the valve disk to seat itself.

While the valve is shown as being permitted to seat itself, I may employ the power of the follower 40 to force the valve on to its seat to secure a tight joint to prevent the supply of grease below the follower 40 from being exhausted and air being drawn into the pump.

In Figures 16 and 17 I have shown a construction of low-level cut-off valve to be used in connection with heavy oil. In this case the double bead valve seat formed about the openings 37 is the same as described in connection with Figures 14 and 15.

An annular cork float 172 connected by wires 173 to top and bottom plates 174 and 175 carries a flanged housing member which is preferably identical with the ones shown in Figures 14 and 15, this housing member 166 supporting the valve disk 162 in substantially the same manner as disclosed in connection with Figures 14 and 15. This housing member 166, however, is connected directly to the bottom plate 175 of the float 172. The float is kept from rising by the spring 177 set in a groove in the pipe 35. When the level descends to a point where the float loses support from the liquid it drops down and permits the valve disk 162 to shut off the valve port surrounded by the members 159 and 160, thereby effectively preventing the drawing of air or further liquid into the pipe 35. The valve 162 is identical with the valve 162 in Figure 14.

In either construction the reservoir may be refilled through the valved filling connection 48 or a modification thereof as heretofore discussed, by forcing grease or oil, as the case may be, into the same. The supply thus introduced merely forces the valve 162 upwardly and in the case of grease, as shown in Figure 14, permits the additional grease in the reservoir to lift the follower 40 to its top position. Preferably a pressure release valve is provided in conjunction with the reservoir to prevent the imposition of more than a predetermined pressure upon the interior of the glass reservoir 27. Such release valve may be contained in the connecting pipe or it may be contained in the reservoir unit construction by communicating with the passageway 56 at the upper end of the tube or pipe 35.

For priming the system the plug 69 which closes the discharge check valve housing may be withdrawn and grease forced in through the said opening, or if desired the refilling nipple 48 may be removed and a pipe inserted inside of the tube 35 beyond the inlet 37 to charge the tube 35, the pump and the pipe line system with grease or other lubricant.

I shall now describe the air supply unit.

*Air supply unit*

As previously stated the air supply may be secured either by an automatic air pump of the inertia type or any other type. I have shown herein a shock absorber operated pump for compressing and storing the air and for periodically releasing the same as one embodiment and a manually controlled valve between an external source of compressed air and the pumping unit as another embodiment.

The unit 22 shown in Figure 1 which is an automatic shock absorber operated air pump unit is shown in detail in Figures 2, 3, and 4 and a modification thereof in Figures 5 and 6. The shock absorber cylinder 10 is preferably the rebound cylinder and the unit 22 is mounted back of the same and connected to the inside of the same. So far as functional requirements are concerned, the unit 22 might be connected to the impact absorbing cylinder 12. I prefer, however, to carry the unit 22 back of the shock absorber so that the same is shielded from road gravel and the like which may be thrown by the wheels.

The unit 22 as shown in Figures 2, 3 and 4 comprises a diaphragm head member 179 having a stem 180 which is hollow to provide a passageway 182 communicating with the inside of the shock absorber cylinder 10. A cooperating diaphragm head 183 has a flange which is threaded over the periphery of the head 179 to clamp between the two heads the diaphragm 184. The head 179 has an annular flange 185 which confines the peripheral circular edge of the diaphragm 184. The two heads 183 and 179 form a diaphragm chamber within which the diaphragm 184 is adapted to play. This diaphragm is connected by a stem member 186 to a compressor plunger 187 playing in a bore 188 in the cylinder of the cylinder frame member 189. The head member 183 is provided with a hollow boss 190 which is threaded into a socket formed in a cylinder frame member 189 and the stem of the diaphragm extends through said hollow boss 190. The stem 180 of the first cylinder head has a ring 192 threaded and soldered upon the outer end thereof and a threaded sleeve 193 is adapted to bear against said ring 192 which provides a suitable shoulder for forcing the stem 180 into fluid-tight engagement with the gasket 194 lying at the bottom of a threaded socket 195 into which the threaded sleeve or hollow plug 193 is screwed. This coupling permits the joint to be drawn up tight without turning of the unit 22.

The diaphragm stem 186 has a pin extending through the diaphragm and riveted over a plate or washer 197 as indicated at 195 to secure the stem to the diaphragm. The washer or plate 197 is adapted to rest in a recess in the head 179 and the shoulders of the stem 186 are adapted to engage the shoulders at the bottom or recess formed in the head member 183.

The head 183 is adapted to support the diaphragm 184 over substantially its entire working surface since the pressure in the shock absorber cylinder 10 may rise to high values.

A certain definite displacement is required to make a complete stroke of the diaphragm 184 in its chamber and unless the compression of liquid in the shock absorber cylinder 10 is sufficient to make such displacement the stroke of the compressor piston 187 will not be completed, and compressed air will not be discharged past the check valve 214. Such action is inherent and automatic. The road shocks to which the compressor is responsive may also be controlled by inserting a one-way flow restriction or a straight flow restriction between the shock absorber cylinder 10 and the diaphragm chamber.

The interior of the head 183 communicates with atmosphere through a passageway 198 extending into a chamber 199, this chamber being formed at the bottom of a threaded socket into which the stem 200 of an air cleaner 202 is included. The air cleaner 202 comprises a cup-shaped body 203 having the hollow stem 200. The member 203 has its opening of larger diameter interiorly threaded to receive the threaded flange of a cover member 204 which is formed of sheet metal with a conical central portion and a central restricted atmospheric opening 205.

Between the edge of the threaded flange and the shoulder 207 formed on the interior of the cup member 203 I provide an air filter consisting of a pair of screens with a body felt 209 interposed therebetween.

Any other form of filtering body may be provided if desired. It is desirable to keep atmospheric impurities such as dust out of the air compressor and out of the interior of the diaphragm chamber which must breathe due to its motion. A diagonal inlet passageway extends from a chamber 199 into the cylinder bore 188 through the medium of a valve port which is overrun by the pumping plunger 187. The cylinder body 189 terminates at the left hand end in a discharge valve chamber 212 the housing for which is defined by an integral extension of the cylinder frame 189, a lateral discharge passageway 213 being provided to permit the compressed air after passing the check valve 214 to be discharged into the chamber 215. The chamber 215 is formed as a hollow sheet metal ball having an attaching neck 216 threaded into an integrally formed socket 217 forming a part of the cylinder frame 189. The discharge check valve 214 seats upon a yielding valve seat disposed in the bottom of the discharge check valve housing 212, the pumping plunger 187 approaching very closely to the valve 214 in order to avoid clearance losses. A discharge check valve spring 218 seated in a spring pocket in the screw plug 219 normally holds the valve 214 to its seat.

The neck 216 of the sheet metal chamber 215 engages a suitable gasket 220 to form an air-tight joint for confining compressed air in the chamber 215. The chamber 215 communicates by way of a passageway 222 with a valve port 223 surrounded by a yielding valve seat 223' of the pressure release valve member 224.

The pressure release valve member 224 comprises a housing 225 formed integral with the valve frame member 189 and having a laterally extending socket 226 for the pipe connection to the compressed air supply pipe 99 leading to the grease pump heretofore described.

The housing 224 provides a valve chamber 227 between the hollow plug 228 and the yielding seat 223' in which a disk valve 229 consisting of a disk of sheet metal with a central bulge and outer flat marginal portion is housed. The plug 228 carries on its inner face a yielding ring or gasket member 230 which is adapted to be engaged by the margin of the valve 229 when the same is forced to the rear to seal off the atmospheric opening 232 which normally communicates with the pipe 99 through the chamber 227. A suitable spring 233 seated in the pocket in the plug 228 normally holds the valve 229 upon its yielding seat 223'. The rear end of the plug 228 is recessed to receive a screen 234 which screen is preferably cup-shaped, the flange of which is gripped by the ring 235 to hold the same in place. This screen prevents the entry of foreign matter into the interior of the valve body.

As shown in Figure 4 the piston 187 is lubricated by a lubricating pipe connection 236 which may provide lubricant from any suitable source, as for example a metering unit where oil lubrication of the type disclosed in my copending application Serial No. 370,245, filed June 12, 1929, is provided.

If desired any other suitable form of lubricating supply may be connected to the pipe 236.

In Figures 5 and 6, I have shown a modified form of the air pump where solid lubrication is provided as for example by the graphite or other lubricant of a solid or semi-solid character shown in the form of a ring 237 which is held in place by a suitable follower or ring 238. Any other suitable form of lubrication may be provided. It is not desirable to drive grease into the pipe 236 by the operation of the grease pump in view of the fact that the excess grease would be driven into the reservoir 215 and would tend to clog up the same.

It will be observed that the reservoir 215 is placed in such a position that condensate, that is condensation of moisture in the chamber 215 may collect in its lower portion. The reservoir has a relatively large space which may be thus filled with moisture without danger of blocking the discharge valve or the pressure release valve 224 or injuring any of the parts in case of freezing. The chamber 215 is shown as made of two pressed sheet metal parts soldered together, but obviously the same may be formed in any other desired form and may be provided with a blow-out cock for removing the water of condensation, although I prefer to use a sheet metal chamber 215 and to clear the same of condensate by periodically unscrewing the chamber 215 and dumping out the contents.

It will be observed that the cover 204 of the air screen has a conically downward directed interior wall, which will tend to throw out by gravity through the opening 205 any particles which enter and are intercepted by the filter 209.

The operation of the automatic air pump is as follows: When the shock absorber piston is moved downwardly in the cylinder 10, liquid is driven through the passageway 182 into the diaphragm chamber to force the diaphragm 184 to the left to perform part or all of a compression stroke. If the impulse of pressure in the chamber 10 is not of sufficient duration to complete the compression and discharge stroke, the motion may be ineffective. Upon minor road shocks and rapid vibrations of the wheel with respect to the body, compression strokes may not be completed. Also, as above explained, a flow restriction either one way or both ways, may be inserted in the connection 182 if desired to select the amplitude of vibration of road shocks which must be attained before compression strokes of the pump are made.

When the piston in the cylinder 10 rises, the diaphragm 184 will be thrown to the right by the suction in the chamber 10, that is by the preponderance of atmospheric pressure upon the left-hand side of the diaphragm 184. Obviously, if desired, a spring might be employed to make the return stroke, but I consider this less desirable. When sufficient compression strokes have been made by the piston 187 overrunning the inlet passageway 210, and driving compressed air past the check valve 214 to charge the chamber or reservoir 215 with compressed air at the selected pressure, the valve 229 opens being blown to its rear seat to cut off the atmospheric passageway 232 and putting the chamber 215 in communication with a pipe 99.

Where the mechanically actuated valve shown in Figure 7 is employed the exhaust valve 104 will be pulled from its seat when the motor has made its complete stroke, thereupon the pressure will be depleted in the pipe 99 and connected parts and the valve member 229 will be pressed to its seat by the spring 233.

This immediately opens the atmospheric vent 232 to the pipe 99 and the pressure in the pipe 99 and connected parts is quickly depleted.

In the case of the hydraulic bleeder shown in Figure 9, or the straight air bleeder shown in Figure 13, the depletion of pressure in the pipe 99 and connected parts to a predetermined value lets the spring 233 seat the valve 229 upon its seat 223' and the pipe 99 and the motor cylinder are thereupon connected to atmosphere through the opening or port 232.

However, the various means shown for permitting the escape of pressure from the motor cylinder and explained in connection with Figures 7 to 13, may be employed in connection with a manually operated valve where air pressure from an external supply is furnished to the grease pump motor and no atmospheric or bleeder connection such as 232 is provided. Hence the various forms of exhaust or bleeder valves heretofore shown are satisfactory, either in connection with the pump shown in Figures 2 to 6 or the manually controlled supply valve shown in Figures 28 to 30 inclusive, or the hand operated pump shown in Figure 31.

I shall now describe the pipe line system.

*Pipe line system*

As heretofore explained, the discharge of the lubricating pump is through the pipe 72 and to distributing pipes 76 and 77 leading to each side of the chassis frame. The pipe 76, see Figure 1, leads down to a metering unit 239 which is connected to the shackle bolt 7 and through the passageway 240 in the shackle 6 to the shackle bolt 8. The unit 238 may be of the type shown in Figure 24 or Figure 25 comprising a resistance passageway in conjunction with the bearings of the bolts 7 and 8 to be lubricated. The pipe line system then continues by way of the pipe 240' to the four-way connection 242 which connection is mounted upon the lower flange of the channel frame 1. (See Figures 18, 19 and 37.) From the four-way connection, the pipe line system continues by way of the pipe 243 to the unit 244 which is an elbow type of metering unit for lubricating the spring bolt 5.

At the four-way connection 242 pipe 245 leads upwardly to the front wheel brake mechanism and the flexible pipe 246 leads in a hair-pin turn disposed in substantially horizontal position to the axle and its connected steering and wheel mechanism. Referring first to Fig. 20, the pipe 245 leads upwardly through the connection 247 in which resistance plug 241 is located to the shank 248 of the mounting ball 249 for the spindle 250, which supports the front wheel brake actuating shaft 252.

This shaft 252 has an operating arm 253 (Fig. 18) connected thereto for turning the said shaft 252. The shank 248 of the ball 249 is drilled longitudinally and the ball 249 is drilled transversely as indicated at 254. The socket housing 255 provides a cavity about the ball 249 which becomes filled with grease. The housing 255 is closed by the plug 256 at the top and the escape of grease at the open side of the housing is retarded by the felt or cork gasket 257.

The spindle 250 is drilled longitudinally as shown at 258 and grease is projected through said drilling into the chamber 259 from which it is distributed along a groove 260 to another cavity adjacent the liner or bushing 263 of the bearing of the brake operating shaft 252 upon the spindle 250. The chamber 259 also communicates with the universal joint mechanism 264 which it lubricates through a passageway 265. The universal joint mechanism is closed in a leather or other fabric boot 266 which tends to become filled with grease to a greater or less degree, which is kept in contact with the universal joint connection 264 to secure a thorough lubrication of the same. The space between the housing 255 and the shaft 252 is likewise covered by a collapsible fabric or leather boot 267 fastened to the spindle 250 and to a stationary collar bearing upon shaft 252. There is sufficient restriction to the outflow of grease from chamber 259 to the universal joint that grease will be discharged into the bearing between the spindle 250 and its shaft or sleeve 252.

Grease may also work into the boot 267 but the outlet between the groove 260 and the end of the sleeve or bushing 263 is sufficient restriction to insure the filling of the cavities in advance of the boot or diaphragm 267.

The flexible hose 246 shown in Figs. 18, 37, 38 and 39 comprises an inner wall 267 of a spirally wrapped metal strip to form a flexible metallic hose and the outside of this is covered with a sheath of soft rubber 268. At each end a metal ferrule 269 having a socket gripping the end of the rubber sheath 268 is disposed. This ferrule is necked down at 270, the extreme end being flanged out as indicated at 272 and a threaded coupling sleeve 273 being disposed about the necked portion and being adapted to force the flange 272 into engagement with the gasket 275 in the bottom of the threaded socket 276 to which it is coupled. The socket 276 is formed on the four-way fitting 242 as shown in Figure 37 and a similar socket 277 is formed in the four-way fitting 278 mounted upon the front axle 3 as shown in Figures 18, 38 and 39. The necked portion 270 engages the spiral wall of the inner lining 267 and is soldered thereto to make a tight joint.

The four-way fitting 278 on the front axle comprises the coupling arm 280 for coupling to a socket 282 upon the front axle 3. A threaded coupling sleeve 283 forces the flanged end of the leg 280 against a suitable gasket 284 in the bottom of the threaded socket 282. This coupling screw and coupling member 280 firmly mount the unit 278 upon the front axle.

The flexible hose 246 communicates with the diagonal passageway 285 leading to the central part of the body 278. A back outlet 286 provides a socket for the connection of the tube 287 which extends along the web of the front axle 2 to the opposite side of the chassis frame. This connection 287 may be omitted particularly where both sides of the frame have their longitudinal pipe lines fed in parallel from the pump unit. A like four-way coupling at the opposite side of the frame may be connected to a king bolt, flexible hose coupling and the like at said opposite side in order to equalize the connection, or such connection may be employed for the distribution of grease from one side to the other side, although I prefer as pointed out the branch pipes 76 and 77 leading to each side of the chassis frame.

A front connection is provided through a check valved filling nipple 288 which if desired may be replaced by a closure plug.

Preferably, however, I employ the check valved inlet plug 288 which comprises a hexagonal central portion with a relatively fine thread upon the inner end thereof and a relatively coarse thread upon the outer end thereof. The inner end is flanged in to form an abutment for a spring 50 which holds the cork or other resilient tapered valve plug 52 in place in a tapered seat.

The connecting arm 280 which is coupled to the axle communicates with a passageway 289 (Fig. 18) leading to a recess 292 surrounding the king bolt 290. This recess 292 is preferably formed by a groove extending around the shank of the bolt. From this groove a longitudinal groove 293 extends to each of the bearings of the steering knuckle of the front wheel spindle 294. The upper bearing as shown is a roller bearing and the upper end of the groove 293 communicates with the cavity formed about said roller bearing, this cavity being closed by the cap 295.

The cavity 296 which is thus closed communicates by a diagonal drilling 297, an axial drilling 298 and a radial drilling 301 with the interior of the wheel hub 299 so that the cavity 300 within said wheel hub may be filled with grease to lubricate the spindle bearings of the front wheel. These bearings are shown as roller bearings.

The axial passageway 298 has its outer end closed by a threaded plug 279 which carries an extension or stem the lower end of which stem fits relatively closely in the drilled passageway and is provided with a helical groove forming a resistance plug 281 between the passageways 297 and 301. In an optional modification of my invention, as will be explained later, the resistance plug 281 may be omitted.

The front part of the cavity is closed by the hub cap 303. The rear end of the hub is closed by a felt washer 302 or other sealing gasket. The felt or like gasket 302 is not fluid tight and forms an outlet more or less restricted.

The lower end of the king pin 290 is provided with a circumferential groove 304 and longitudinal grooves 305 to permit filling of the cavities adjacent thereto with grease from the groove 293. Suitable sealing means, such as felt or cork washers, are provided at top and bottom of each end of the axle arm to seal off the escape of grease, from the bearings.

The spindle fork or steering knuckle has connected thereto the steering arm 306 (Fig. 19) upon which there are two ball and socket connections viz. the connection 307 to the drag link 308 and the universal connection 309 to the tie rod 310. A tube 312 extends from a socket 313 communicating with the circumferential groove 304 on the king bolt to a T connection 314 one arm of which 315 leads to the bearing 309 between the tie rod 310 and the steering arm 306 and the other arm 316 of which leads to the bearing between the steering arm 306 and the drag link 308. The pipe 315 communicates with a socket at 317, this in turn having a passageway connecting with the circumferential groove 318 formed about the upper end of the shank 319 of the ball 320. The shank is cross-drilled at the groove 318 and is longitudinally drilled through the ball 320.

The longitudinal drilling delivers grease into the cavity in cap 324 below the spherical bearings 322 and 323. The tie rod 310 has a housing which supports the spherical bearings 322 and 323, the lower end of the housing being closed by cap 324 and the sealing gasket 325 being provided about the upper end of the shank to seal off the escape of grease. The housing is preferably sealed off from the tie rod 310, by a plug as shown in Figure 18. Grease from the cavity below the ball 320 is conveyed into the two hemispherical bearings 322 and 323 by slots 321 cut in the surface of the ball 320. These slots do not extend above the upper bearing 323.

The branch pipe 316 which leads to the connection between the steering arm and the drag link 308 terminates in a socket 326 (see Figure 22). This pipe through the socket communicates with a circumferential groove 327 on the shank 328 of the ball 329. The shank 328 is secured in the end of the steering arm 306. The ball 329 is gripped between the hemispherical bearings 330 and 332 in a housing 333 formed in the end of the drag link 308. The drag link 308 is preferably formed of a tube, a screw plug 334 closing the outer end of the tube and supporting the spherical bearing 332. The inner bearing 330 is pressed by compression spring 335 against the ball 329, said spring resting against an abutment formed by hollow plug 336 resting against the shoulder of the expanded end of the tube of which the drag link 308 is formed. The housing 333 has a bottom opening 337 through which the shank of the ball projects. This opening is sealed by spring-pressed plate 338 engaging felt or cork gaskets to prevent the escape of grease from the cavity surrounding the ball 329. The ball and shank are drilled longitudinally and this drilling communicates with the groove 327.

The cavity in housing 333 which is supplied with lubricant through the longitudinal drilling in ball 329 communicates thru a slotted passageway 331 with the recess or cavity in which the spring 335 is seated. An opening 339 through the bearing 330 admits grease into the bearing. The opposite bearing 332 likewise has a central opening into which grease becomes lodged and serves as a source for distribution.

The washers and hollow plug 336 have openings therethrough to permit grease to fill the shaft 340 of the drag link 308 and to deliver grease through a like construction at the opposite end to the spherical bearings 343 and 342 gripping the ball 344 with the cavity 345 surrounding the same. The cavity 345 is sealed by a cover plate like the cover plate 338 heretofore described.

If desired the hollow plugs 336 in the opposite ends of the shaft of the drag link 340 may be connected by a tube 346 of relatively small diameter to avoid filling the entire drag link with grease.

Now from the above description it may be seen that I have shown a typical bearing construction and a structure whereby grease may be delivered to the bearings of the front wheel brake operating mechanism, the front wheel spindle, king bolt and the universal connections between the steering arm, the drag link and the tie rod. The construction upon the opposite side of the vehicle may be the same, the drag link connection however being omitted.

In Figure 21, I have shown the rear frame horn 347 with the shank 348 of the ball 349 connected thereto, grease being delivered to a groove 350 about the shank of said bolt. By a longitudinal drilling 352 through the ball and shank and a cross-drilling 353 in the shank and a cross drilling 354 in the ball, grease may be delivered from the pipe 356 through a metering unit 351 into the cavity 357 surrounding the ball 349 and through an opening 358 in one of the spherical bearings, a groove 359 about the bolt 360, and a drilling 362 through an arm of the shackle 363, through a passageway 364 communicating through a drilling 367 in the bolt 365 to grooves 366 upon opposite sides of the bolt 365. The bolt 365 is drilled transversely in register with the groove 366 and longitudinally at 367. A short radial drilling puts the axial drilling 367 in communication with the vertical passageway 364. It will be seen from this construction that I have provided cavities in connection with each of the bearing surfaces from which lubrication to the bearing may be supplied. The cavity 357 is sealed off at the left by a spring pressed follower 368 and a sealing gasket bearing against both the surface of the shank and the surface of the cap or cover member 369.

I shall now describe a resistance unit such as may be employed in connection with bearings to be supplied by my system, either in advance of the bearing itself or in advance of the cavity communicating with the bearings.

As shown in Figure 24, the unit 238 comprises a cross-shaped body having the two side arms 370 and 372 which are connected to pipes 373 and 374. The pipes or tubes 373 and 374 may be of copper or iron, or they may be of aluminum. They may also be prepared as disclosed in connection with my copending application Serial No. 385,295, filed August 12, 1929, that is by depositing upon the inside a film of gelatin which is hardened with formalin or formic acid or otherwise treated to render the same adhesive and resistant to wear but capable of maintaining a film which is repellent to grease, for example moist gelatin being maintained in such condition by moisture contained within the grease.

In fact, the entire pipe line system of my invention may be thus prepared to reduce the internal friction with grease. The piping, that is the tubes such as 373 and 374, may be made of aluminum polished or burnished internally for reducing the friction to the flow of grease in the pipe line system.

The body of the unit 238 has a shank 375 about the outer surface of which there is disposed the coupling sleeve 376 of hexagon shape at its upper end and screw-threaded at its lower end to thread into the threaded socket 377. The lower end of the shank 375 is flanged outwardly as shown at 378 to form a shoulder which is engaged by the lower end of the threaded sleeve 376 and forced by said threaded sleeve into engagement with a gasket 379 to form a fluid-tight joint.

The body of the unit 238 is provided with a longitudinal opening or bore the upper end of which bore is threaded as indicated at 380. The outer end of the bore is closed by a screw plug 382 which has a tapered shoulder at 383 for forming with the edge of the body a tight closure. The head of the plug is preferably of a polygonal shape to be engaged by a wrench or it may be provided with a slot for a screw driver. The plug 382 carries the resistance plug member 384 which comprises a cylindrical member having a helical groove formed therein to provide a passageway between the plug 384 and the shank 375 to establish communication between the pipes or tubes 373 or 374 and the inside of the bearing. This plug 384 is joined to the plug 382 by a portion of reduced cross-sections 385, this stem imparting a certain degree of flexibility to the two parts of the plug so that the resistance portion 384 may center itself in the lower end of the bore even though the upper end of the plug is not exactly in line. The body of the unit 238 is preferably formed of forged brass and the side sockets such as 370 and 372 are swaged or shrunk either by mechanical pressure or by swaging with a series of blows to shrink the diameter of the outer part of said socket and also constricting the underlying parts of the tubes 373 and 374 to form a fluid-tight joint.

The internal pressure which tends to force the tubes 373 and 374 endwise tends to seal the joints between the parts. The helical passageway about the body of the resistance plug 384 is large enough to pass any ordinary impurities found in grease so that grease may pass through the passageway so provided by the helical groove and into the passageway 386 and into the bearing. Where I have not shown any cavities, grooves or passageways in connection with Figure 24 it is to be understood that illustration hereof is only for the purpose of making plain the structure of the resistance unit.

In Figure 26 I have shown a similar unit. In this unit 387, the shank 388 is formed of a diameter such that it will provide a good drive fit with the socket 389 of the bearing 390. The head of the screw plug forms a suitable face for pressing or drawing the unit into its socket.

The lower end of the shank 388 is chamfered off as indicated at 392 to facilitate piloting or guiding the shank into the socket 389.

In Figures 25 and 27, I have shown similar units for use in connection with a heavy oil.

In Figure 25 the body 393 is a T shaped body with a single outlet arm 394 connected to the pipe 395. This is optional. The shank 396 is embraced by the coupling sleeve 397 which forces the lower flanged end 398 into engagement with the gasket 399 to provide communication with the inside of the shank 396 with the passageway 400 leading into the bearings.

The body 393 is provided with a longitudinal bore, the upper end of which is closed by the screw threaded part 402 of the plug member 403. The resistance plug portion 404 is provided with a helical groove of smaller dimensions than the groove shown in Figures 24 and 26 but suitable to pass a heavy lubricant such as steam cylinder oil or 600 W. However, where oil is used it is necessary to employ means for preventing draining of the oil from the system as for example from one part of the system out through a bearing. For this purpose I provide the cup leather 405 which is held within the cylindrical bore by a headed pin 406 driven into the lower end of the bore formed in the resistance plug member 404. The pin 406 holds the cup leather 405 upon the end of the plug 404 and the natural expansion outwardly of the cup 406 against the cylindrical walls of the bore in which the plug 404 is seated, effectively closes off passage of fluid in the reverse direction, that is from the bearing toward the pipe 395. Oil which is driven under pressure from a pipe 395 through the resistance groove readily passes the cup leather 405 and enters the bearing through the passageway 400.

In the embodiment shown in Figure 27 the shank 407 is fitted into the socket 408 with a drive fit as explained in connection with Figure 26. The construction of the unit shown in Figure 27 is except for this difference the same as that shown in Figure 25.

From the above it will be apparent that I have provided a pipe line system in which I distribute grease or heavy oil to the bearings, these bearings being formed preferably with cavities either incidental to the construction of the same or intentionally formed therein to provide reservoirs in immediate communication with the bearings to be lubricated. This permits ready delivery of grease to the various bearings with minimum resistance of flow, since it is not required that the grease be delivered into a small substantially tight space as has been the practice heretofore. In the present instance, I provide free flow of grease into such cavities and such cavities have the secondary advantage of retaining in contact with the bearing or in immediate communication therewith a store of lubricant which may act as a reserve in case of exhaustion of the central supply, or any interruption to normal delivery of grease to such cavities. It is well known that the chassis bearings if well packed in grease may run for relatively great distances with no further lubrication.

While normally my automatic system is designed to make a delivery stroke of a small definite charge of grease every fifty miles, it can be seen that if this normal delivery is interrupted for any cause, the bearings will not suffer even though the supply of grease is not replenished immediately because of the reserve which these cavities provide, and the ability of grease to stay in place to a far greater degree than a thinner lubricant such as thin oil.

It is to be observed that the pump displaces a definite volume of grease at each stroke and this volume is intended to be only sufficient to make up the loss of all of the bearings for by way of example 50 miles of driving.

The outlets of the bearings may be made tight enough to prevent the escape of grease except in negligible quantities and hence when a bearing is once filled with grease and none has escaped therefrom the further introduction of grease not being necessary and being prevented from entering will cause distribution to those parts which require the distribution. This however, is not feasible in the case of such bearings as the drag link bearing where any appreciable pressure will raise the cover plate and permit escape of grease.

It is intended in all cases that the distribution shall be predetermined and substantially adhered to throughout the operation of the system. To this end instead of having the resistances at the outlets of the cavities, I prefer to permit a reasonable escape from the cavities and restrict the flow at the inlets to the cavities as by the resistance plugs above mentioned. This facilitates the distribution of grease in the pipe line system to the various bearings and facilitates the emission of equal quantities where equal quantites are desired.

Figures 41 and 42 are schematic drawings of my system showing two methods of distribution of the lubricant throughout an automobile chassis. Figure 41 shows the lubrication of four front axle bearings and four other bearings using resistance units while Figure 42 shows the same arrangement without resistance units. In both systems certain of the axle bearings are lubricated in series while the other four bearings are lubricated in parallel. The showing of the four axle bearings explains how the lubricant passes either into the bearings and then into cavities surrounding the bearings or first into the cavities and then into the bearings. Starting from the right in Figure 41, the first bearing is the king bolt bearing 291, the second the spindle bolt bearing 490, the third the tie rod bearing 309, and the fourth the steering knuckle bearing 307. Starting from the right again, the lubricant which is placed under pressure by its lubricant pump of the unit 19 moves from the right into a substantial groove 293 on the side of the king bolt 290. After the lubricant has passed the king bolt it moves into a cavity surrounding the king bolt, then through a resistance unit 281 into a cavity surrounding the spindle bearing. It will be noted that the cavity of the spindle bearing has a small outlet 492 which is the felt packing of the spindle bearing which offers a relatively small resistance to the lubricant under pressure.

Going back to the king bolt bearing, which is substantially lubricant tight, the groove adjoining the king bolt with its lower outlet through which the grease moves is connected to a T 314 from where it moves to the tie rod bearing which has no resistance unit connected with it in the embodiment shown in Figures 18 and 19, but which may have a resistance connected in series therewith as shown at 493 in Figure 41. When entering the tie rod bearing assembly the grease first enters the lower cavity in cap 324 which is lubricant tight and then enters through large grooves 321 into the tie rod bearing and after encountering substantial resistance at the rest of the bearing the very small amount of excess grease passes into the upper cavity and after completely filling same passes through the relatively small resistance of the felt plug 325 to the atmosphere. After passing the T 314 below the tie rod bearing 309 the lubricant moves through a resistance unit 494 as shown in Figure 41 to a cavity 333 and from this cavity through substantial grooves into the steering knuckle bearing. The steering knuckle bearing has at its left a resilient spring operated spindle pin cover 338 which acts as a safety valve.

Going back now to the T 495 below the lubricant pump unit 19, the lubricant moves through a pipeline 496 and from there to four bearings 497—498—499—500 each having a resistance unit 502 at the entrance thereof. Each bearing is so designed that substantially all resistance to the incoming grease is done away with by supplying substantial sized grooves 503 longitudinal of the bearings and cross grooves 504 at the sides of the bearings. It will be noted that the king bolt bearing cavity and the lower tie rod bearing cavity are so designed that they have no free outlets for the incoming grease, the grease must, therefore, first substantially fill both these cavities before it will pass through the resistance units either from the king bolt bearing to the cavity of the spindle bolt or the cavity of the steering knuckle bolt.

In case it is desired to place a resistance unit between the T 314 adjoining the tie rod bearing and the tie rod bearing cavity as shown in Figure 41 the groove at the tie rod bearing which in the previously explained embodiment as shown in Figure 18 did not go all the way through would now go all the way through the upper bearing half 323 and the excess of the lubricant which is metered by the resistance unit 493 attached to the tie rod bearing will escape through the relatively low resistance of the ring-shaped felt cap 325 adjoining the openings of the bearings. In such case this would be illustrated in the top of the cavity of the tie rod bearing 309 in the form of a small hole 505 as shown in Figure 42.

As can be seen from the drawings both the spindle bearing 490 and the king bolt bearing 291 on the one hand and the tie rod bearing and the steering knuckle bearing on the other hand are lubricated in series with the king bolt bearing 291. The tie rod bearing and the steering knuckle bearing relative to each other are lubricated in parallel.

In Figure 43, I show in one-half natural size a section through two shackle bolt bearings 507 and 508 which are lubricated in series. The principle wherein I employ in lubricating the king bolt and the spindle bolt bearings in series is also employed in the shackle bolt bearings 507 and 508. That is to say, the first bearing through which the lubricant passes must have a relatively large resistance to the incoming lubricant while the last bearing lubricated in series will have a relatively low resistance or substantially no resistance. I, therefore, let the lubricant first pass through the resistance unit contained in the metering unit 509 attached at the right side of the top of the upper shackle bearing 507.

From there it goes through a short vertical conduit 510, a circular groove 512 and two longitudinal grooves 513—514 to the left side of the upper bearing thus filling the two longitudinal grooves full of grease. At the end of the longitudinal grooves 513—514 the grease goes through another circular groove 515 and two cross holes 516 to a centrally located hole 517 of the upper shackle bolt 7, from there through a vertical hole 518 in the left shackle to a centrally located hole 519 in the lower shackle bolt, from there through a cross hole 520 to a circular groove 521 in the lower shackle bolt and from there through two longitudinal grooves 522—523 in the bushing and through cross grooves 524 at both sides of the lower bearing to the atmosphere. The cross or radial grooves communicate with an annular groove 525 which communicates with the longitudinal grooves 522—523. It will be noted that the two longitudinal grooves 513—514 in the upper bearing 507 do not go to the end of the bearing, which therefore offers a substantial resistance which will prevent the grease from oozing out the upper shackle bearing, so that the remote lower shackle bearing 508 may receive the proper supply of lubricant.

When the grease has completely filled the two longitudinal grooves 522—523 and one circular groove 521 it will quickly spread around the whole bearing due to the crescent shaped play in the bearing and the motion between bolt and bearing.

It will be noticed that I prefer to use bearings which when lubricated in parallel are so designed as to offer substantially no resistance to the incoming grease. The reason why I do this is as follows: When oil is used for lubricating purposes and the oil can is left open the impurities like grit, dust, etc., which will blow into the open can will always settle to the bottom of the can and when strained through a strainer advantageously situated a relatively small amount of grit will accumulate on the strainer. In case grease is used and the can is left open, all the grit, dust, etc., which may blow into the open grease can will not sink to the bottom but will stick to the surface of the grease. This is the reason why grease even when delivered perfectly pure by the grease manufacturer always has a much larger amount of impurities than oil. Since grease is always exposed to the atmosphere during its manufacture, it is always apt to collect at its surface a large amount of grit and dirt and will, therefore, be delivered to the consumer in an impure condition. The feeding of grease by suction to a lubricant pump using a grease follower, as described in this application, and without passing a screen will encounter no difficulty but when a fine mesh screen is interposed in the pump inlet difficulties are encountered in drawing the grease from the grease reservoir and the subsequent movement of the follower. The use of such a screen will also result in a relatively quick clogging up of the fine holes of the screen due to the large amount of impurities in the grease, as explained above.

In case it is desired to use a low pressure system to feed the grease to the intake of the grease pump this pressure would, as soon as enough grit and dirt has clogged the holes of the screen, break the screen and all the accumulated grit would in bulk be suddenly conveyed to all the resistance units completely clogging them thus preventing any grease from reaching the bearings. I have, therefore, decided not to use any screens in the present centralized lubricating system using grease as lubricant.

As already explained in a former paragraph of this application pertaining to the description of my resistance units, I have decided to use a relatively large cross-sectioned area in the resistance coil passageway of my resistance unit in order that the relatively coarse grit contained in grease may pass unobstructed through the relatively large passageway of the resistance coil of the resistance unit.

Resistance units using a resistance passage of relatively large cross-sectioned area through which the grease has to pass will naturally offer only a medium resistance to the incoming grease. The fundamental principle in centralized lubrication using resistance units is that the resistance of the resistance units must always be larger than the resistance of the tightest bearing. If this principle would not be adhered to, the bearing offering the lowest resistance would get most of the lubricant while bearings with large resistance would receive little lubricant or none at all.

It can, therefore, be seen that when using resistance units with medium resistance that the bearings must be so designed that they must offer less resistance to the incoming grease than the resistance of the medium type resistance units. For this reason I have designed my bearings in such a manner that they offer either very little or substantially no resistance to the incoming grease under pressure, which bearing resistance will always be less than the resistance of the medium type resistance units used in my construction.

The second schematic drawing Figure 42 shows no resistance unit but I use bearings every one of which has either a large cavity or small cavities in the form of longitudinal and circular grooves of substantial size. In this construction I prefer to give my bearings a limited resistance. This is accomplished in some of the bearings by having the longitudinal grooves terminate near the end of the bearing and the resistance on the sides of the bearings is eliminated by using the same cross grooves 504 or 524 as shown on the lower part of the shackle. The system of employing limited bearing resistance is also used on all the other bearings surrounded with large cavities. There are certain advantages of the present system and reasons for its employment. It must be remembered that I am using grease which does not flow but stays put wherever it is placed. It must be further remembered that I use an automatic system of centralized lubrication which forces into the bearings definite relatively small amounts of grease in relatively short periods of time.

The sole purpose of injecting these small amounts of grease is to keep the cavities around the bearings or adjoining the bearings constantly filled with fresh lubricant which does not flow but stays put. If on the other hand I should use a manual system of centralized grease lubrication where the amount of lubricant to be forced into the bearings at one time is left to the discretion of the operator, an excessive amount of lubricant may be forced into the pipe line system at one time with the result that this excess of lubricant or most of the lubricant may be forced through the bearing or bearings of lowest resistance.

Centralized grease lubricating system with external source of air supply

As I have explained above the grease pump and reservoir unit of my invention may be operated in conjunction with any suitable source of air supply.

For example on a truck or bus having air brakes of known type, where a supply of compressed air is available, it is not necessary that the automatic air pump of my invention be employed. A tap or connection may be made from the air reservoir of the braking system through a suitable control valve, to the air operated grease pump of my invention.

For example, in Figure 28, I have shown the reservoir and pump unit 19 which may be like that shown in Figure 7 or optionally as shown in Figures 9 or 13 capable of making a delivery stroke when a charge of compressed air is delivered to the motor cylinder and capable of making a suction stroke when the air is exhausted from the motor cylinder. I provide in conjunction with the same, a suitable air supply pipe 409 extending from the manually controlled valve and reservoir unit 410. The unit 410 is connected to the air reservoir 412 of the bus through a suitable connection 413. The air reservoir is charged with air automatically through an air compressor driven by the engine. The unit 410 is shown in cross-sectional view in Figure 29.

This unit comprises a body 414 having a threaded socket 415 into which there is threaded the neck 416 of the sheet metal reservoir 417, this reservoir being constructed substantially as shown in Figures 2 and 3. The neck 416 has an inwardly extending flange which is threaded against a gasket 418 to make a fluid tight joint. The air supply pipe 413 is connected to the body 414 through a compression coupling 419. Likewise the air delivery pipe 409 is connected to the body through a similar compression coupling 420. The central part of the body has a chamber 422 formed therein, this chamber being formed in part by the cylindrical recess in the body 414, the outer end of the recess being closed by the ported plug 423, this plug threading into the ends of the bore and forming an air tight joint therewith as by means of a tapered shoulder 424.

The plug 423 has a passageway 425, the inner end of the passageway terminating in a valve port surrounded by the yielding valve seat 426. A valve stem member 427 extends through the wall of the chamber from the front and bears at its inner end a conical valve member 428, which is adapted to cooperate with the yielding seat 426 to form a gas tight joint. The stem 427 is guided in a bore in the body 414 and the joint between the two is sealed off by a flanged leather ring 429, the flange being held in place by a metal washer 430 pressed against the same by the compression spring 432 the outlet end of the spring engaging a washer 433, this washer bearing against the back of the valve member 428.

The stem 427 which is introduced into its guiding bore from the back in the assembly of the device is provided at its outer end with a pull handle 434 which is preferably formed in the shape of a circular button threaded upon the end of the stem, this stem being flattened or slabbed off at opposite sides as indicated at 435 to permit the stem to be readily held against rotation.

The interior of the reservoir 417 communicates with the pipe 409 through a passageway 436 formed in the body 414.

The body is mounted upon the instrument board 437 by projecting the stem of the body 438 through an opening in the instrument board and clamping the body against the back of the instrument board by means of a clamping nut 439 which is then covered by an ornamental sheet metal nut 440.

Now it may be seen that by pulling outwardly on the handle or button 434, the valve 428 is unseated from the yielding seat 426 upon which it is forced by the compressed air in the pipe 413. As soon as the valve is opened the reservoir 417 is charged with compressed air and at the same time the air is applied through the pipe 409 to the motor cylinder of the grease pump. The handle 434 may be released after a mere momentary opening since the pressure will quickly rise in the reservoir 417 to that of the main air supply reservoir 412 and the expansion of the charge of air in the reservoir 417 is sufficient to make the discharge stroke of the grease pump even if the same is performed relatively slowly.

In Figure 30, I have shown a modification of the unit 410, this modification consisting in arranging the valve 442 to be opened by pressure upon the button 443 instead of pulling out on the button 434. In this case the body 414 provides a central chamber 444 through which the stem 445 projects. The flanged leather sealing gasket 429 seals the stem and the guiding bore in which it lies.

A metal plate 446 is set in a shoulder near the upper end of the central bore and the yielding washer 447 forms a valve seat for the conical valve 442, which is held thereagainst by compression spring 448 seated in a spring pocket 449 in the outer end of the mounting stem.

The mounting stem is clamped upon the instrument board 437 as previously described, that is by means of the clamping nut 439 and the ornamental nut 440. In this embodiment the spring 448 normally holds the valve 442 shut against the internal pressure of air in the chamber 444. To charge the air reservoir 417 with compressed air for making a stroke of the grease pump, the button 443 is pressed to open the valve 442, the reservoir 417 being quickly charged with air from the main reservoir 412. The button 443 is then released and the valve 442 closes, the expansion of the air in reservoir 417 then completing the stroke of the grease pump.

The operation of distributing grease from the grease pump through the pipe line system is substantially the same as described in connection with Figures 1 to 27 inclusive.

The grease distribution system may extend in a single continuous pipe line to the various bearings but preferably a branch runs from the reservoir 19 to each side of the chassis frame, and from each such longitudinal line the grease is distributed to the respective bearings on the chassis frame and to the axles if desired.

It might be explained in this connection that to reach the rear axle, a flexible hose coupling such as was described in connection with the joining of the frame and front axle may be employed.

I shall now describe means to facilitate the operation of the system particularly during extremely cold weather when the grease is relatively stiff.

*Means to facilitate cold weather operation*

When the car having the lubricating system of my invention is maintained continuously in a cold garage or left out of doors and subjected to continuous usage, the temperature if it remains low for a considerable period, hinders the operation of the system because of the stiffness of the grease. Where I speak herein of cold weather I refer to extreme cold, such as continuous temperatures of the order of 20° to 40° F. below zero or even lower.

In Figure 31, I have shown the main operating units of my invention in diagram; namely, the automatic air supply unit 22 comprising a shock absorber operated pump reservoir and pressure discharge valve leading through the pipe 99 to the grease pump of the reservoir and pump unit 19, and the pipe line system 20 leading to the various bearings of the automobile which are to be lubricated.

In continuous cold weather it is desirable that the automatic system be supplemented by other means for insuring the delivery of grease to the bearings.

While it is well known that bearings which are maintained free of grit and the like require very little lubrication, it is desirable that lubrication be definitely established. I provide the manually operable air pump 450 mounted upon the bulk head 18 preferably under the hood. This air pump is shown in detail in my copending application, Serial No. 370,245 filed June 12, 1929, particularly Figures 61 to 63 thereof. I wish to say here that the pump comprises a working piston for compressing air and a discharge valve mounted in the central stem thereof, which central stem is clamped by means of a clamping nut 452 to the bulk head 18. An elbow connection 453 joined to the stem beyond the check valve of the pump and pipe 451 puts the said pump into communication with the air storage reservoir 215. The discharge of the pump 450 is connected to the reservoir 215 through a boss on the body 189 communicating with the cored passageway 222, see Figure 6.

The car with the lubricating system of my invention is driven into a warm garage or other space where the entire car may be brought to a temperature which will facilitate the flow of grease into pipe line system, then the manually operable air pump 450 is operated until sufficient air has been delivered to the system to charge the reservoir and open the pressure controlled valve 229 and to cause operation of the grease pump 53. This may be repeated the desired number of times.

As an alternative construction to provide manual operation of the system, I have applied a small manually operable pump 454 (Fig. 32) to the grease pump 53, this pump 454 having a cylinder 455 communicating with the pump cylinder 78 through a passageway 456. The cylinder which is preferably formed integral with the frame of the pump and with the main frame 24 of the unit has a cooperating pumping piston 457 recessed to receive the compression spring 458. This spring holds the piston in its outward position even against the suction of the motor operating pumping piston 79. The piston 457 is held in its cylinder by a head member 459, which embraces the stem 460, and is threaded upon the outer end of the cylinder member. The stem is of a diameter slightly less than the diameter of the piston 457 so that a shoulder is formed between these parts. A suitable button or operating member 462 is secured upon the outer end of the stem 460.

In this embodiment when the operator desires to secure the delivery of grease to the pipe line system through the bearings by manual operation or under manual control, he reciprocates the piston 457 by pressing upon the button 462 to make a discharge stroke and releasing the same to permit the spring 458 to make a suction stroke.

The main inlet and discharge check valves of the motor operated pump 53 serve as the inlet and discharge check valves for the manually operated pump 454. Since the main operating spring 89 of the motor piston is strong enough to effect the suction stroke of the pumping piston 79, it will be seen that the pump 454 may be operated without actuation of the automatic grease pump 53 and vice versa.

In Figure 36, I have shown a fitting 463 which is adapted to be inserted in the pipe line system at any convenient point; for example, adjacent the grease delivery pipe 72 under the hood of the automobile. This fitting 463 comprises a pipe connection in which the tubes 464 and 465 are joined as by soldering the same in suitable sockets. The fitting 463 has a foot or base 466, which is adapted to be secured to a suitable mounting member as for example, the bulk head or dash board 18. The diagonal branch 467 has a threaded socket 468 into which there is threaded the check valved nipple 469 having the yielding conical check valve member 470 of the type heretofore described (see for example the filling nipple 48 shown in Figures 9 and 10). The yielding plug or valve 470 may be of cork or the like and is held in place by the spring contained within the nipple, the outer end of the nipple having relatively coarse threads to which there may be connected a grease gun, such as described in my co-pending application, Serial No. 395,878, filed September 28, 1929. Such fittings 463 may be placed at any convenient point in the pipe line system. If desired a contact nipple may be provided in the system wherever I have shown the threaded nipple for coupling to a grease supply gun or reservoir.

A single fitting placed under the hood of the car communicating with the pipe 76 and 77 permits the operator to apply a grease gun and force grease into the system by hand, for example, when lubricating the car in cold weather.

Where the suitable check valved inlet connections are to be distributed throughout the car, I prefer instead of inserting them in the pipe line system to insert the same in direct connection with the bearings, as shown for example in Figures 33 and 35. In Figure 33, I have shown a resistance unit which embodies the features heretofore described in connection with the embodiment shown in Figure 24. However, the plug member 382 embodying the reduced stem 385 and the resistance plug member 384 is provided with a longitudinal bore 472 in which there is seated a compression spring 473 held in place against a shoulder formed by beading in the margin of the bore, as indicated at 474. The upper end of the bore terminates in a conical valve seat 475 in which there is adapted to be seated the yielding plug valve 476, which may be of cork or the like. A relatively coarse thread which may be a multiple thread is shown at 477, this coarse thread being adapted to be engaged by a corresponding coupling member 478 forming the outlet of the grease gun 479, shown in Figure 34.

The coupling 478 comprises a body member in the upper end of which there is mounted a check valved fitting 480 embodying a check valve like that shown at 476. Below the check valve a passageway 482 terminates in a yielding ring gasket 483, which is adapted to engage the end face of the coarsely threaded head of the plug member 382.

The grease gun is provided with a suitable cylinder and piston for forcing grease through the check valve fitting 480, and past the check valve 476 through the longitudinal bore 472 of the plug member 382, and directly into the bearings.

In Figure 35, I have shown an alternative construction in which such forcing of the grease through the bore 472 delivers the grease to the bearings to the exclusion of the resistance passageway formed upon the plug member 384. In other words, I provide a valve between the two passageways leading into the bearing, this valve being in the shape of a cup leather 484 bearing against the cylindrical inside walls of the shank 375 and having its bottom held against the bottom of the resistance plug unit 384 by means of a thimble 485 having a tubular portion forced into the central bore 472, and having a flange 486 bearing against the bottom of the cup leather to hold the same firmly in place. The cup leather may be expanded as by means of a wire ring 487, if so desired. The use of this ring is optional. Now it may be seen that when grease or other lubricant is forced down the central bore 472, the cup leather 484 prevents escape of the same through the resistance passageway. Likewise when grease is forced down the resistance passageway it forces its way past the cup leather 484 and into the bearings, but it cannot pass up through the bore 472 since the outer end of the same is closed by the check valve 476. The upper end of the unit shown in Figure 35 is identical with that shown in Figure 33. Optionally it may have a contact nipple for the central bore 472 or be otherwise provided with a separate valved inlet.

Preferably I make the plugs, shown in Figures 33 and 35, interchangeable with the plugs shown in Figures 24 and 25, and where a car is adapted to be shipped to a territory subjected to extremely cold weather, such plugs as shown in Figures 33 and 35 may be substituted for the plugs shown in Figures 24 and 25, to permit of the local application of a lubricant.

I wish to call attention to a secondary advantage residing in the construction shown in Figures 33 and 35, and that is this, that while it is not feasible to change the lubricant in a centralized lubricating system from grease to a heavy oil because of the difficulties encountered in distribution after changing from a heavy lubricant to a lighter lubricant, it is possible with my invention now to have a centralized grease distributing system which will operate satisfactorily under all ordinary conditions but in extreme cases it may be advisable to supplement the same with a more fluid lubricant. By the construction shown in Figure 35, for example, it is possible to fill the grease gun with a heavy oil and discharge heavy oil into the bearings without the introduction of any of the heavy oil into the grease distributing system. In this manner regardless of the extreme temperature automatic operation may be supplemented by the introduction of a proper lubricant without in anywise interfering with the automatic centralized lubricating system. Furthermore I may by this construction fill the grease gun with kerosene and wash out a bearing particularly, a frozen bearing without taking anything apart. After such washing out a charge of lubricant of any desired character may be introduced into the bearing. I consider this function and capability to be broadly new.

From the above it will be seen that I have provided adequate means for accomplishing the foregoing objects.

It is to be observed that the lubricating pump 53 will make only a single stroke for each application of compressed air thereto. By this means it is possible to predetermine the frequency of strokes of the pump by a proportioning of the size of the air reservoir 215. That is to say, if it is desired to have more frequent strokes of the lubricating pump the reservoir 215 is made of a smaller capacity so that the pressure will be more quickly raised to the value at which the pressure release valve 228, is set to operate. Conversely if it is desired to have the strokes of the lubricating pump less frequent, the size of the chamber 215 is increased so that more strokes of the air compressor will be required to change the same to the desired pressure. The capacity of the chamber 215 within such variations is adequate to make a complete stroke of the motor member of the lubricating pump.

It is to be noted that the spring 89 makes both the suction stroke of the pump system 79 and also the return stroke of the motor member or motor piston 87. In the form shown in Figure 7, it is necessary for the motor piston and pump piston to make a complete stroke or substantially a complete stroke before the exhaust valve will be opened. In case of clogging of the discharge of the grease pump, as for example in very low temperatures, this might tend to accumulate an excessive pressure in the air supply system in case the system were very tight, however, the automatic discharge valve 224 may be so proportioned that the expansion of air from the reservoir 215 with such leakage as cannot be avoided will shortly after the application of pressure to the motor piston allow the valve member 229 to be restored to its seat under the influence of spring 233.

This difficulty is not encountered in the forms shown in Figures 9 and 13 since there is a bleed or blow-down port in that system.

I may, if desired, make the suction stroke of the pump by pneumatic pressure and permit the discharge to be made by a spring of predetermined strength so that if the system is blocked by excessive stiffness of the grease or from some other cause, the suction stroke will be made and the exhaust valve opened. If the spring which is permitted to make the discharge stroke cannot do so the exhaust valve remains open until the stroke can be made.

The manner of combining the air operated grease pump with the reservoir may be widely varied and as I have shown in my copending application, Serial No. 397,337 filed October 4, 1929, the air operative pump may be disposed at the lower end of the reservoir and the mounting of the glass reservoir itself may be varied.

I do not intend to be limited to the details shown and described.

I claim:

1. In a vehicle having bearings to be lubricated, the combination of a distribution conduit, a centralized supply of lubricant, a positive displacement pump between the supply and the conduit, said vehicle having a hydraulic shock absorber, air compressing means hydraulically actuated by said shock absorber, and a fluid pressure operated means for making a stroke of the pump, said means being operated by compressed air supplied by said air compressing means.

2. In a vehicle having bearings to be lubricated, a distribution conduit therefor, a centralized supply of lubricant, a positive displacement pump between the supply and the conduit, fluid pressure operated means for making a discharge stroke of the pump, a hydraulic shock absorber for the vehicle, an air compressor actuated hydraulically by said shock absorber, a reservoir for compressed air delivered by the air compressing means, and an automatic valve for periodically connecting the reservoir to said fluid operated means.

3. In a centralized lubricating system, in combination with a plurality of bearings to be lubricated, a pipe line system therefor, and metering units, automatic means for distributing lubricant of one character to said bearings through said pipe line and said metering units, and additional means for supplying lubricant of a different character to said bearings through said metering units.

4. In a centralized lubricating system, in combination with a plurality of bearings to be lubricated, a pipe line system and metering units, automatic means for distributing lubricant to said bearings through said pipe line and said metering units, and manual means independent of said automatic means for supplying lubricant to said bearings through said metering means.

5. In a centralized lubricating system, in combination with a plurality of bearings to be lubricated, a pipe line system and metering units, automatic means for distributing grease to said bearings through said pipe line system and said metering units, and additional optionally operable means for supplying oil to said bearings through said metering units.

6. In a centralized lubricating system, in combination with a plurality of bearings to be lubricated, a pipe line system and metering units, automatic means for distributing lubricant to said bearings through said pipe line system and metering units, independent means for supplying lubricant to said bearings through said metering units, and an automatic valve between said first means and the second means, to prevent the discharge of lubricant from the second means from entering the pipe line system.

7. In a centralized lubricating system, in combination with a plurality of bearings to be lubricated, metering units, automatic means for distributing lubricant to said bearings through said metering units, and means for supplying lubricant to said bearings through said metering units independently, and means for preventing the escape of lubricant from one aforesaid means to the other aforesaid means.

8. In combination, a hydraulic shock absorber, a motor member operated by the variations of pressure in the shock absorber, an air compressor directly connected to the motor member, an air storage reservoir, a displacement pump having a motor element, a connection from the reservoir to the motor element, and a valve periodically opened to apply the air in the reservoir to the motor element of the pump.

9. In combination, a hydraulic shock absorber, a motor member operated by the variations of pressure in the shock absorber, an air compressor directly connected to the motor member, and air storage reservoir, a displacement pump having a motor element, a connection from the reservoir to the motor element, and a valve periodically opened to apply the air in the reservoir to the motor element of the pump, and means for exhausting the air from the said motor element of the pump.

10. A pumping system comprising the combination of air compressing means, air storage means, a positive displacement pump, a fluid pressure operated motor member adapted to be driven in one direction by compressed air, and means subject to pressure of the air in the air storage means and operable upon the attainment of a predetermined pressure therein for connecting said storage means to the motor member.

11. A pumping system comprising the combination of air compressing means, air storage means, a positive displacement pump, a fluid pressure motor member adapted to be driven in one direction by compressed air, means subject to pressure of the air in the air storage means and operative upon the attainment of a predetermined pressure therein for connecting the storage means to the motor member, and vent means for exhausting the air applied to the motor member after the motor member has been operated.

12. A pumping system comprising the combination of air compressing means, air storage means, a positive displacement pump, a fluid pressure motor member adapted to be driven in one direction by compressed air, means subject to pressure of the air in the air storage means for connecting said storage means to the motor member, and vent means for exhausting the air applied to the motor member, said last named means comprising a flow resistance passageway.

13. A pumping system comprising the combination of air compressing means, air storage means, a positive displacement pump, a fluid pressure motor member adapted to be driven in one direction by compressed air, means subject to the pressure of the air in the air storage means for connecting said storage means to the motor member, and vent means for exhausting the air applied to the motor member, said means comprising an exhaust valve operated by the motor member.

14. In combination, a hydraulic shock absorber, a motor chamber having a motor member subject to variations of pressure in the shock absorber, an air compressor operated by said motor member, an air storage reservoir, a motor member adapted to be operated by fluid pressure, a pipe connecting the air storage reservoir with the motor member, and a pressure controlled valve for connecting said pipe alternately to said air storage reservoir and to atmosphere.

15. In combination, an air storage reservoir, a motor member adapted to be operated by compressed air, a pipe for connecting said air storage reservoir with said motor member, and a valve controlled by the pressure in the air storage reservoir for connecting said pipe alternately to the air storage reservoir and to atmosphere.

16. In combination, an air storage reservoir, a motor device constructed and arranged to be operated by fluid pressure in said reservoir, a pipe for delivering compressed air from the air storage reservoir to said motor device, a valve device subject to pressure in the air storage reservoir for connecting the air storage reservoir to said pipe, said valve device having an atmospheric port normally communicating with the pipe, and having means to close said port when the valve opens to put the air storage reservoir in communication with the pipe.

17. In combination, a bracket frame, a reservoir carried on one side of the frame, a pump carried on the other side of the frame, a suction connection from the pump into the reservoir, a discharge connection from the pump, and a fluid pressure motor for the pump carried by the frame.

18. In combination, a bracket frame, a reservoir suspended below the frame, a pump carried on the upper side of the frame, a suction connection extending from the pump through the frame and into the reservoir, a discharge connection from the pump mounted on the frame, and a fluid pressure motor for the pump carried on said frame.

19. In combination, a bracket frame, a glass reservoir carried by the frame, a pump carried by the frame, a suction pipe carried on the side of the frame opposite the pump, a mechanical connection from said suction pipe to the reservoir to hold the same against the frame, a discharge connection for the pump mounted on the frame, a fluid pressure motor for operating the pump, a fluid pressure connection to the pump, and vent means for depleting the fluid pressure from said fluid pressure motor.

20. In combination with bearings to be lubricated, a pipe line system therefor, a reservoir for grease, a positive displacement pump having a suction inlet extending to the bottom of said grease reservoir, a fluid pressure motor for operating said pump, a grease follower in the reservoir, and a valve controlled by the follower for cutting off the connection between the pump and the reservoir when the supply of grease in the reservoir is substantially depleted.

21. In combination with bearings to be lubricated, of a reservoir for lubricant, a positive displacement pump having an inlet connection extending through the lower end of the reservoir and having a discharge connection to the pipe line system, a fluid pressure motor member for operating said pump, and a valve controlled by the level of lubricant in the reservoir for closing off the suction connection when the supply of lubricant in the reservoir is substantially depleted.

22. In combination with bearings to be lubricated, of a pipe line system, a reservoir for lubricant, a positive displacement pump between the reservoir and the pipe line system, a fluid pressure motor for operating the pump, means for preventing the entry of air into the pump when the supply of lubricant in the reservoir is substantially depleted, and a valved inlet connection for introducing lubricant into the bottom of the reservoir.

23. In combination with bearings to be lubricated of a pipe line system, a reservoir for lubricant, a positive displacement pump having an inlet connection opening into the bottom of the reservoir, a fluid pressure motor for operating said pump, and a check valved filling connection communicating with said pump inlet.

24. In combination, a frame member, a glass reservoir having its upper end seated against the bottom of the frame member, a tube extending from the bottom of the frame member through the bottom of the reservoir, a closure for the bottom of the reservoir connected to said tube, said tube having communication with the bottom of the reservoir, and a positive displacement pump mounted on the frame and having an inlet passageway communicating with said tube.

25. In combination, a frame member, a glass reservoir having its upper end seated against the bottom of the frame member, a tube extending from the bottom of the frame member through the bottom of the reservoir, a closure for the bottom of the reservoir connected to said tube, said tube having communication with the bottom of the reservoir, and a positive displacement pump mounted on the frame and having an inlet passageway communicating with said tube, and a check valved filling connection at the bottom of the reservoir communicating with the interior of the reservoir.

26. In combination, a bracket frame, a depending glass reservoir having its top bearing against the bottom of the frame, a suction tube extending from the bottom of the frame and passing through the bottom of the reservoir, a threaded nut mounted on the end of the tube and bearing against the bottom of the reservoir, said tube having an opening into the reservoir at the lower end of the same, a pump having a cylinder mounted on the frame and having inlet and discharge check valve passageways, and a motor member mounted on said frame, said motor member having a piston, the pump having a piston connected to the motor piston, a spring for moving said pistons to make one stroke thereof, and a fluid pressure connection for making the opposite stroke of said pistons.

27. A timed release for pressure fluid comprising an inverted siphon passageway comprising two legs adapted to contain liquid, a constricted resistance passageway disposed below the level of the liquid, and a fluid pressure connection to one of said legs, the other leg being open to atmosphere.

28. A timed release for pressure fluid comprising an inverted siphon passageway comprising two legs adapted to contain liquid, a constricted resistance passageway disposed to form a part of said passageway below the level of the liquid, and a fluid pressure connection to one of said legs, the other leg being open to atmosphere, and a chamber in the atmospheric leg for trapping the liquid driven through said resistance passageway to prevent the liquid being driven out through the atmospheric connection.

29. In combination, a chamber, an inverted siphon passageway having one leg thereof connected to the chamber and the other leg communicating with atmosphere, said passageway being adapted to contain liquid, a helical resistance passageway incorporated in said inverted siphon passageway below the level of liquid, and a quick relief valve leading from said chamber to atmosphere, said quick relief valve being adapted to be closed by the admission of fluid pressure to the chamber and being adapted to be opened when the pressure of said fluid has dropped to a predetermined value in said chamber.

30. In combination, a reservoir bracket frame having a depending flange, a glass reservoir having an open mouth seated within said flange, said glass reservoir having a rounded bottom with an apertured boss in the bottom thereof, a tube anchored in the bottom face of said bracket frame member and extending through said apertured boss, and sealing means mounted on the lower end of the tube and bearing against said apertured boss.

31. In combination, a reservoir bracket frome having a depending flange, a glass reservoir having an open mouth seated within said flange, said glass reservoir having a rounded bottom with an apertured boss in the bottom thereof, a tube anchored in the bottom face of said bracket frame member and extending through said apertured boss, and sealing means mounted on the lower end of the tube and bearing against said apertured boss, and a grease follower in said glass reservoir guided on said tube.

32. In combination, a cup-shaped glass reservoir, a head member for the same, the bottom of the reservoir having an apertured boss, a tube secured to the head and extending through the boss, closure means mounted on the lower end of the tube for engaging said apertured boss to close the same, pumping means having a passageway extending through the head and communicating with the tube, the tube having at its lower end an inlet port, a lift valve adapted to control said port, and means operating upon substantial depletion of lubricant in the reservoir for applying said valve to said seat.

33. In combination, a cup-shaped glass reservoir, a head member for the same, the bottom of the reservoir having an apertured boss, a tube secured to the head and extending through the boss, closure means mounted on the lower end of the tube for engaging said apertured boss to close the same, pumping means having a passageway extending through the head and communicating with the tube, the tube having at its lower end an inlet port, a lift valve adapted to control said port, and means operating upon substantial depletion of lubricant in the reservoir for applying said valve to said seat, and a check valved inlet connection for forcing lubricant into the tube and for raising said valve from its seat.

34. In a centralized lubricating system, bearings to be lubricated, a pipe line system therefor, a centralized supply of lubricant, a pump therefor, said pump having a fluid pressure motor for operating the same, a reservoir for compressed air, means for charging said reservoir with compressed air, and air pressure operated means operable upon the attainment of a predetermined pressure in said reservoir for connecting said reservoir with said motor.

35. In a centralized lubricating system, bearings to be lubricated, a pipe line system, a central source of lubricant, a pump between said source and said pipe line system, an automatic fluid pressure motor for operating said pump, and check valved inlets to said pipe line system for the injection of lubricant into said pipe line system independently of said pump.

36. In a centralized lubricating system, bearings to be lubricated, a pipe line system therefor, a central source of lubricant, a pump having a cylinder and piston with an inlet communicating with the source of lubricant, a discharge connected to said pipe line system, automatic means for operating said pump, a cylinder connected to said pump cylinder, and a manually operable piston in said second cylinder.

37. In a centralized lubricating system for grease, a centralized supply of grease, a pump, a pipeline system and a plurality of bearings having relatively large grease passageways opening outside the bearings and resistance units between said pipeline system and the grease passageways of the bearings, said resistance units having passageways large enough to pass the usual impurities encountered in commercial grease but affording sufficient resistance to substantially equalize the emission at bearings when equal emission is desired.

38. In a centralized lubricating system for grease, bearings having substantially central grease inlets and longitudinal grooves of large relative cross section extending from end to end of said bearings, a pipeline system connecting said bearings, a grease pump for discharging grease into said pipeline system, plates at the ends of said bearings having radially extending grooves for providing free outlets from said longitudinally extending grooves, and resistance units having passageways relatively large in cross section for passing impurities encountered in grease between said pipeline system and the bearings.

39. A lubricant distributing system comprising a dispensing pump, a plurality of bearings, one of the bearings having a substantially closed cavity another bearing having a vented cavity and a pipeline system connecting the pump to the second cavity through the first cavity and others of the bearings connected in parallel to said pipeline system, said latter bearings being provided with vents and resistance units at the inlets of such bearings as are provided with vents.

40. In a centralized lubricating system, a grease pump, a pipe line system, a plurality of bearings vented to provide low resistance to grease flow therethrough and resistance units at the connections between the bearings and the pipe line system having resistance passageways large enough to pass impurities usually entrained in grease.

OSCAR U. ZERK.